(12) United States Patent
Benninghoff

(10) Patent No.: US 11,548,105 B2
(45) Date of Patent: Jan. 10, 2023

(54) APPARATUS AND METHODS OF IMPROVEMENT OF VENDING MACHINES

(71) Applicant: Karen Benninghoff, Chicago, IL (US)

(72) Inventor: Karen Benninghoff, Chicago, IL (US)

(73) Assignee: Karen Benninghoff, Chicago, IL (US)

( * ) Notice: Subject to any disclaimer, the term of this patent is extended or adjusted under 35 U.S.C. 154(b) by 2 days.

(21) Appl. No.: 16/393,442

(22) Filed: Apr. 24, 2019

(65) Prior Publication Data
US 2019/0337104 A1 Nov. 7, 2019

Related U.S. Application Data

(60) Provisional application No. 62/661,699, filed on Apr. 24, 2018.

(51) Int. Cl.
| | | |
|---|---|---|
| *A47F 1/00* | (2006.01) | |
| *B23P 19/04* | (2006.01) | |
| *F21S 9/03* | (2006.01) | |
| *A47B 49/00* | (2006.01) | |
| *G07F 11/72* | (2006.01) | |
| *A47F 1/10* | (2006.01) | |

(52) U.S. Cl.
CPC .............. *B23P 19/04* (2013.01); *A47B 49/00* (2013.01); *A47F 1/00* (2013.01); *A47F 1/10* (2013.01); *F21S 9/037* (2013.01); *G07F 11/72* (2013.01)

(58) Field of Classification Search
CPC .................................. A47B 49/00; A47F 1/00
See application file for complete search history.

(56) References Cited

U.S. PATENT DOCUMENTS

| | | | |
|---|---|---|---|
| 898,995 A | 9/1908 | Simpson | |
| 1,239,753 A | 9/1917 | Antoire et al. | |
| 1,441,438 A | 1/1923 | Leonhardt | |
| 4,667,848 A | 5/1987 | Gold | |
| 5,779,095 A * | 7/1998 | Diamond ........... | B65D 83/0409 221/24 |
| 6,299,015 B1 * | 10/2001 | Hasan ..................... | G07F 11/44 221/24 |
| 6,595,385 B2 * | 7/2003 | Nakamoto ............. | A63H 33/00 221/24 |
| 7,038,398 B1 * | 5/2006 | Lys ......................... | B60Q 3/80 315/291 |
| 2012/0298687 A1 * | 11/2012 | Yeung ..................... | G07F 11/44 221/277 |

* cited by examiner

*Primary Examiner* — Gene O Crawford
*Assistant Examiner* — Ayodeji T Ojofeitimi
(74) *Attorney, Agent, or Firm* — Vedder Price P.C.

(57) ABSTRACT

This disclosure relates to an improvement to vending machines and particularly gumball machines, and is equally applicable to vending machines of like design. A system and method are disclosed to convert a conventional gumball vending machine to a solar light fixture using an inner rod nut. A system and method are disclosed to convert a conventional vending machine to contain a rotary turntable.

5 Claims, 22 Drawing Sheets

FIG. 9
FIG. 10
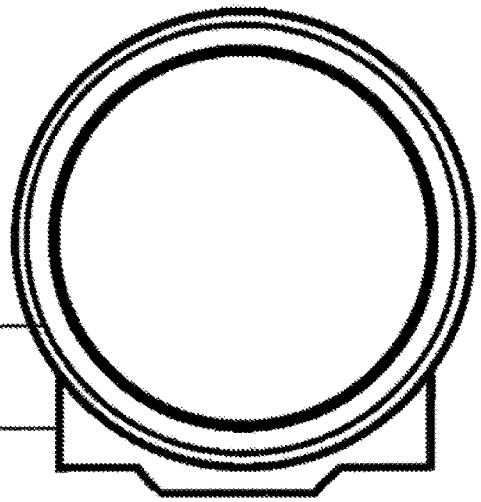
FIG. 11
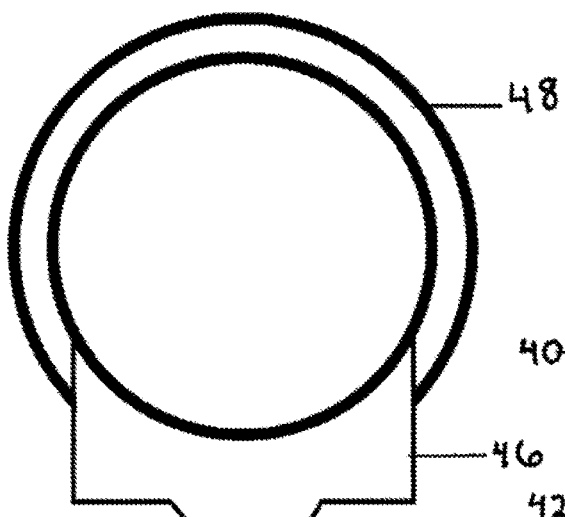
FIG. 12
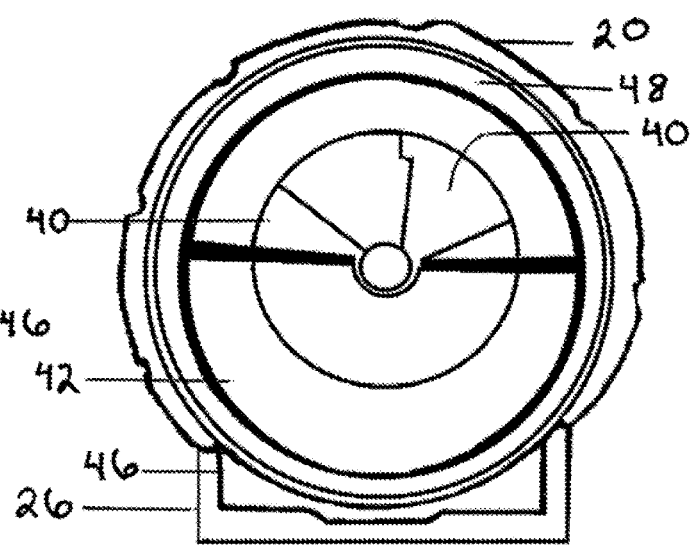

APPARATUS AND METHODS OF IMPROVEMENT OF VENDING MACHINES

CROSS-REFERENCE TO RELATED APPLICATION

This application claims the benefit of U.S. Provisional Application No. 62/661,699, filed Apr. 24, 2018, which is incorporated by reference herein.

FIELD OF THE DISCLOSURE

This invention relates to an improvement to vending machines, and particularly to vending machines known as gumball machines, and is equally applicable to all vending machines of like design, manufacture and/or assembly, whether newly produced or adapted from vintage.

BACKGROUND OF INVENTION

Traditional gumball vending machines currently manufactured are known to be timeless, classic and familiar; long lasting, impressive in their fine craftsmanship, comprised of sturdy materials and of high quality. A gumball machine filled with bright gumballs brings a smile to everyone's face. There is a collectors' market for vintage vending and gumball machines. However, its nature of being produced and marketed for primarily confectionary or gumball dispensing, limits its use to primarily interior or high use locations. Style wise, by virtue of being filled with a perishable food product, limitations apply to its aesthetic incorporation in certain interior locations. It is also known to be primarily a confectionary dispensing machine and, while pleasing to look at, offers no real meaningful use beyond that attribute. At this time Singapore has a ban on importing chewing gum rendering gumball vending machines virtually worthless in that city with other cities contemplating the same ban.

For the above reasons, a conversion of the traditional vending gumball machine to give it a new use while still providing joy seemed in order. The conversion of the tradition vending gumball machine to accommodate an independent solar light illuminating non-perishable fill within its globe results in an eco-friendly, automatic, non-utility consuming alternative to outdoor lighting needs, while maintaining the integrity, craftsmanship, and high quality of the timeless and pleasing design.

BRIEF SUMMARY OF THE INVENTION

This invention converts or constructs with improvements, a vending machine commonly known worldwide as a gumball machine, to a high-quality solar light vending machine made to withstand extreme weather conditions in all climates while providing carefree, reliable, eco-friendly, cost effective outdoor accent lighting for years to come. This invention, by virtue of its solar light, does not throw off any heat or require outside fuel or utility sources. The independent solar light reliably charges in ambient daylight and its sensors activate light at night. This invention provides for a secure and accessible fit of an independent solar light with the ability to replace or upgrade the independent solar light while retaining the vending machine. Weighty and stable, this invention especially conducive for areas exposed to extreme temperatures, precipitation and wind and may be used outdoors virtually anywhere worldwide as improvements to invention enable ability to withstand all climate weather conditions.

An improvement to this invention incorporates eye-catching and pleasing non-perishables fill each globe rendering the solar light vending machine usable worldwide. This invention also incorporates an improvement to invention of conversion kit whereby consumer owned or vintage traditional gumball machines may be converted to solar light vending machines.

For purposes of example, this invention illustrates and describes vending machines known as gumball machines, as available in varying sizes, and the utilization of independent solar lights currently available on the retail market. This invention encompasses the described improvements to invention and improvement characteristics and methodology of which any or all may be applied, as appropriate, to any vending machine of similar construction and assembly for like results.

U.S. Pat. Nos. 1,239,753, 898,995, 1,441,438 and 4,667,848, are found to most closely represent basic embodiments of vending machines of the type as illustrated and applied to this improvement of invention.

Those vending machines, and variations of same, incorporated and referenced herein by way of example as variations of, or same, of vending machines currently manufactured and available to the general public, including, but not limited to, Gumball Machines in three standard sizes of King, Junior, Petite plus Gas Pump. The traditional gumball machine is selected as example for this invention as its overall design, weight, construction and materials proven to be extremely durable, long lasting, of high quality, as currently manufactured and available on the open market.

Generally, the type of solar light utilized in this invention contains or is comprised of one more solar cells aka amorphous solar panel mounted on top of a housing which encompasses a rechargeable battery, light emitting diode(s) "(LEDs), a photo-resistor, arranged to recharge the battery and power the LEDs, and parts thereof, commonly marketed and available for retail sale commonly referred to as solar path lights. Many versions, variations and size of this type of solar light are currently available on the retail market and it is anticipated the appropriate size and shape will be used to best accommodate the particular size and style of the solar light vending machine.

The present invention relates to an improvement to vending gumball machines whereby appropriate drain/air holes are incorporated in the base plate and cash drawer at their lowest levels when upright ensuring water does not accumulate within the base of the solar light vending machine. The drain holes and placement in the present invention eliminates that issue. Metal and glass produce condensation in humid, moist conditions. The solar light vending machine, by virtue of being outdoors, will be subjected to precipitation in form of rain, snow and sleet. By incorporating or ensuring appropriate drainage in the solar light vending machine as the present invention describes, moisture accumulation will be minimal, thereby preventing/deterring rust and eliminating ice expansion damage. In addition, drain holes in the base and cash drawer also serve as air holes promoting air movement within the solar light vending machine, globe and solar light cap further encouraging evaporation of any moisture.

The present invention provides an improvement to a vending gumball machine which renders the machine agreeable to accept an independent solar light for secure yet removable fit to the secured globe. In an improvement to invention is the modification to the assembly rod(s) and method of securing the assembly rod(s) whereby the length of the rod is reduced to allow adequate space for the independent solar light bulb to project light uniformly downward into the globe and, secured with the addition of one nut, provides a stable and secure assemblage of solar light vending machine components.

In an improvement to invention is the removal of the traditional gumball machine cap and key to replace same with an independent solar light cap and method of securely attaching to solar light vending machine. An improvement to invention includes the style or type of independent solar light used in said invention which ensures the solar light bulb placed downward into the glass globe to enhance the independent solar light LED's radiance while protecting the globe contents. An improvement to invention is the method of securing an independent solar light to the secured globe by snap-on method. Another improvement to invention is the method of securing an independent solar light using a hook and loop or hook to hook fastener system. An improvement to invention is to construct independent solar light cap with center female screw threads resembling original gumball machine cap and reconfiguring lights to outer inside edges and fastening to unreduced inner rod via independent screw. An improvement to invention is to modify the spider basket to add tabs to outer upper rim matching width and spacing of currently produced or newly manufactured solar light cap for a tab to slot attachment of solar light cap to solar light vending machine. Over a period of many years it is expected the solar light vending machine will outlast the solar light. The invention improvements provide for a secure yet removable fit of the solar light to the secured globe and provide the ability to replace or upgrade the independent solar light at any time while retaining the solar light vending machine.

An optional addition of a splash guard for the coin mechanism provides precipitation and debris deflection while maintaining the vending machine's classic design and is shown as an improvement to invention. While not vital, it is suggested that the protection it affords outweighs the minor cost associated with producing same.

Another object of the invention is to ensure maximum preservation of the solar light vending machine as exposed to outdoor elements by ensuring an exterior finish in clear or color is applied to all metal parts of the solar light vending machine and, if appropriate, to the independent solar light cap. The improvement to invention incorporates an exterior paint/finish or specialty coating is applied to the independent solar light cap to closely match or complement the solar light vending machine. This improvement to invention particularly conducive to associating with product or sports branding.

An improvement to invention is to apply an exterior paint/finish or specialty coating, referencing glitter, simulated chrome and/or color, to the visible inner workings of vending machine to compliment or match the color and finish of base of solar light vending machine from its current gray color. It should be noted the addition of an exterior paint/finish or specialty coating further enhances light reflection/refraction of the solar light within the globe.

An improvement to invention provides for the addition of non-perishable fill within the globe to replace the currently popular gumballs or confectionary generally found to be unfavorable in outdoor settings. This improvement considers that fill may be purely decorative in nature; may be of a size approximately the size of a gumball in order to easily pass through the adjustable dispensing wheel; or, a combination thereof. The improvement incorporates that the fill may include virtually any representation of leisure, outdoor activities, sports team, theme and brand associations, to name a few. An improvement to invention incorporates the addition of a figurine(s) to the inside of the globe and/or decals representative of a certain theme or brand thereby widening the scope of consumer audience and various methods of attachment.

An improvement to invention is a rotating turntable operated by the coin mechanism utilizing currently manufactured components. An improvement to invention is the addition of a diorama or scene attached to this rotating turntable displayed within the globe and illuminated by the solar light. These improvements enhance the enjoyment of the solar light vending machine in that the user inserts a coin and/or turns the handle and is rewarded with a rotating scene.

An improvement to invention is whereby certain components are offered as a solar light vending machine conversion kit. The conversion kit may be offered in the common sizes of King, Junior and Petite and Gas Pump for home conversion of current or vintage gumball machine to solar light vending machine. As an extension to this improvement is an opportunity for the ability to return to the supplier the parts no longer needed post-conversion. This in effect recycles those parts as they, in turn, may be resold by supplier as original vintage parts appealing to collectors.

An improvement to invention is to adapt base plate of Junior and Gas Pump size machines with the identical thread configuration of the King size in order to similarly attach to same sized traditional gumball machine stand. Use of a stand provides additional security and stability to an already stable solar light vending machine, particularly in areas subjected to extreme high wind conditions. Current stability of solar light vending machines tested to 60 knot winds with no movement. While it is believed the machine is as secure in higher winds, the addition of a stand to all size machines provides the ability to fasten or secure the assembled machine and stand to a fixed structure such as balustrade of high rise balcony, fence post, upright dock or pier post, or other such structure conducive to fastening for security purposes. The Junior and Gas Pump size machines are as pleasing on the traditional gumball machine stand as the larger King machine. This improvement incorporates a standard size threaded base plate cavity be incorporated on all sizes of solar light vending machines which corresponds to currently manufactured universal size stand affording all machines ability to secure to structure.

An improvement to invention is to suggest the NiCd (nickel cadmium) rechargeable battery currently provided with the solar light be replaced with the environmentally friendly NiMh (Nickel Metal Hydride) battery. While current NiCd batteries have a life of approximately 500 hours, or one and a half years of daily use, NiMh batteries not only deliver more power lasting longer in high drain devices, but can be charged up to 1000 times providing three to four years of daily use. NiMH batteries are free of toxic or hazardous elements such as cadmium, lead, mercury or lithium and can be disposed of safely. It is anticipated improvements will be made to rechargeable batteries in the future. An improvement to invention is to allow for such future upgrades. An improvement to invention is that components comprising solar light bulb be recyclable.

BRIEF DESCRIPTION OF THE DRAWINGS

FIG. 9 is an overhead view illustrating a component to improvement of invention as in FIG. 1.

FIG. 10 is an overhead view illustrating assembly of improvement component of FIG. 9 to component in FIG. 2.

FIG. 11 is an underside view illustrating assembly of improvement component of FIG. 9 to component of FIG. 2.

FIG. 12 is an overhead view illustrating FIG. 9 improvement assembly to solar light vending machine of FIG. 1.

DETAILED DESCRIPTION OF THE INVENTION

Figure 1:
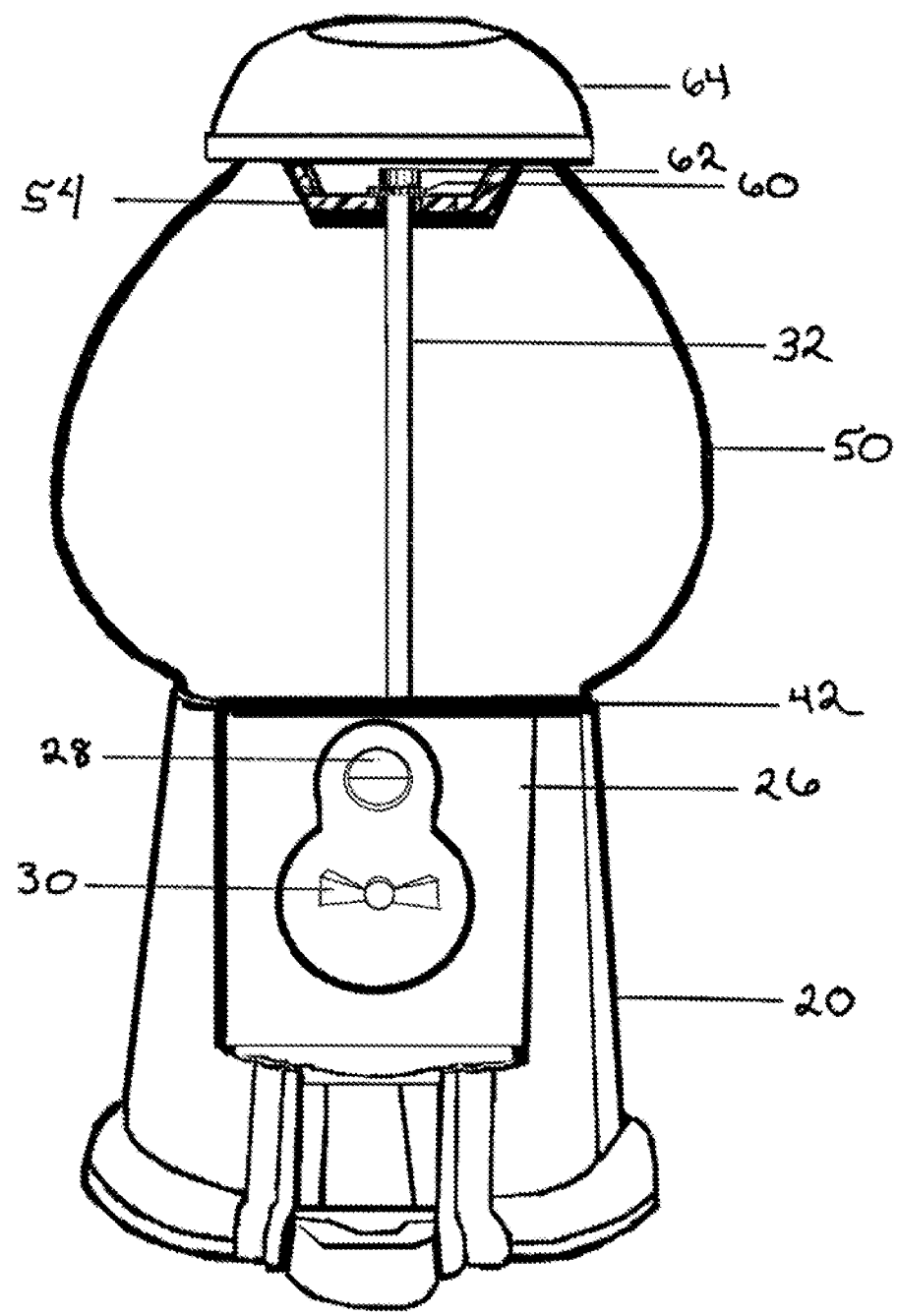
FIG. 1 is a front elevational view illustrating a solar light vending machine constructed in accordance with the principles of the invention.

For purposes of example, this invention illustrated and described utilizing vending machines known as gumball machines and solar lights currently available on the open market. This invention encompasses the described improvement to invention and improvement characteristic and methodology of which any or all may be applied, as appropriate, to any vending machine of similar assembly for like results.

Turning now to the drawings, which describe the presently preferred embodiments of the invention for the purpose of illustrating the practice thereof, and not by way of limitation of the scope of the invention, and in which like reference characters refer to corresponding elements through the views referenced.

FIG. 1 comprises the invention in its assembled and ready for use state illustrating a traditional gumball vending machine and its commonly used components of same, with improvements to invention. Components illustrated are described as: base 20 to which globe 50 is attached by means of inner rod 12 and outer rod 32 secured to spider basket 54 with outer rod nut 60 and inner rod nut 62 respectively. Solar light cap 64 is attached by snap-on method or by using an alternative improvement to invention as described more fully in FIGS. 8, 13-16. A coin mechanism 26, illustrated with coin slot 28 and handle 30 is incorporated fully in its current design and mechanics.

Figure 2:
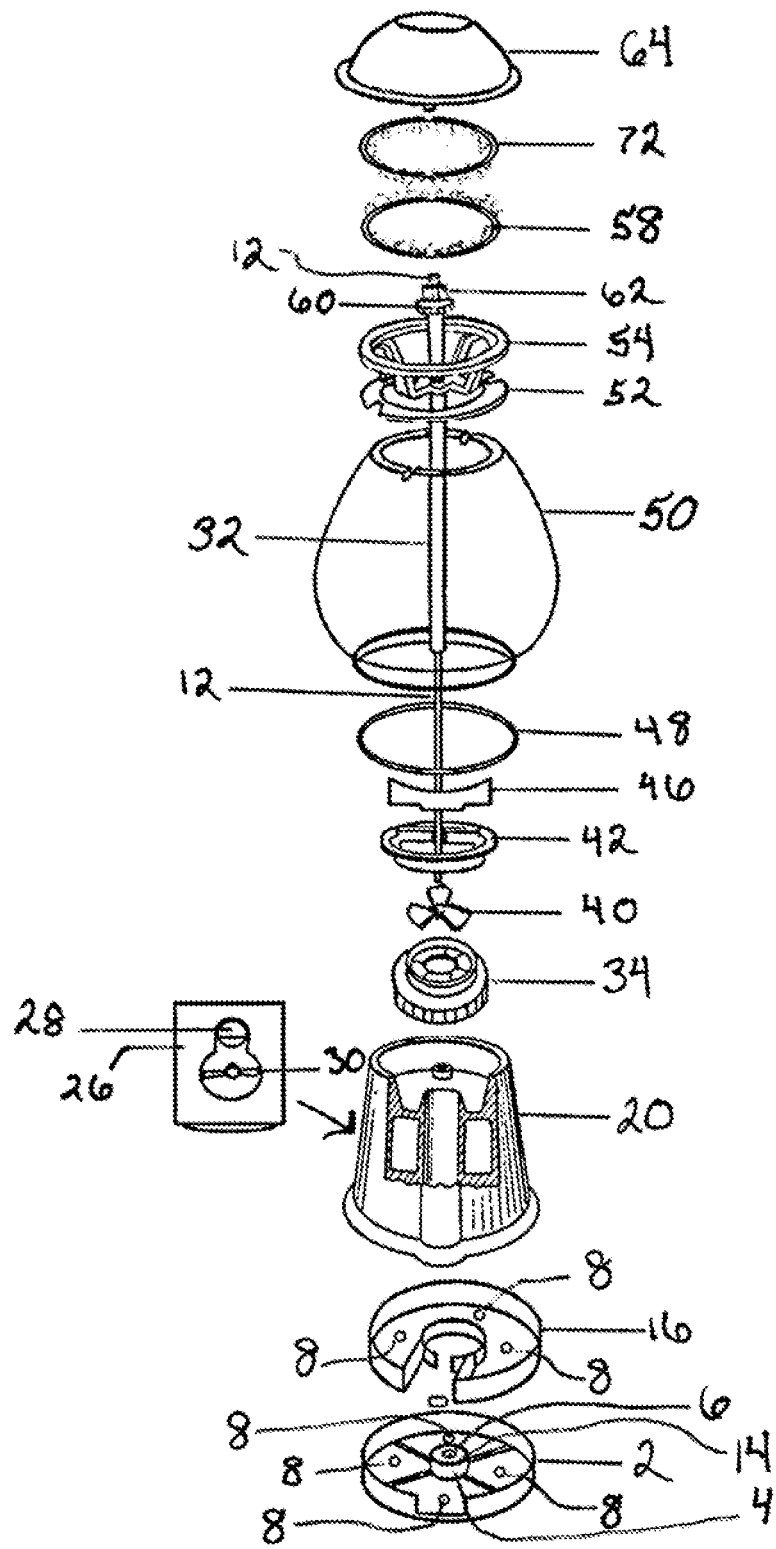
FIG. 2 is a front elevational view illustrating the components and assembly of the solar light vending machine of FIG. 1.

FIG. 2 illustrates the components, improvements and assembly configuration of the solar light vending machine of FIG. 1 and incorporates commonly used components of a similar vending gumball machines, some of which have been improved upon in this invention. As the solar light vending machine is logically assembled from the bottom upwards, FIG. 2 is described as such in order of assembly: At the bottom of the solar light vending machine is base plate 2 into which drain holes 8 have been added as an improvement to invention and further described in FIG. 3.

At center of base plate 2 is threaded base plate cavity 4 comprised of screw threads in the center bottom and base plate threaded center hole 6. King sized base plates 2 are generally found to contain threads in threaded base plate cavity 4 which correspond to and attach a stand 114, see FIGS. 5, 18, 26. An improvement to invention includes adapting base plate 2 of the Junior size machines with the identical thread configuration of the King size in order to attach either to the same sized stand 114. Stands 114, useful and pleasing in any outdoor environment, provide additional security and stability to solar light vending machine by securing to fixed object.

Base nut 14 is screwed onto one end of inner rod 12. Inner rod 12 may be completely threaded or comprised of screw threads at both ends. The inner rod 12 end with base nut 14 is then screwed clockwise into the base plate threaded center hole 6 of base plate 2. Inner rod 12 is made secure to base plate 2 by adjusting base nut 14 downwards. Inner rod 12, an improvement to invention, further described in FIGS. 5, 6, 8 and 15. To the bottom of base plate 2 so as not to impede drain holes 8, bumper pads or surface grips 10 may be added to protect tabletop surfaces.

A cash drawer 16 is inserted over the top of base plate 2, with inner rod 12 passing through its center. Cash drawer 16 is traditionally comprised of molded plastic to which air or drain holes 8 may be already incorporated. In the event those drain holes 8 are not already incorporated, an improvement to invention is to add drain holes 8 and further described in FIG. 4.

Base 20 of the solar light vending machine is then placed over cash drawer 16 and base plate 2 by means of guiding inner rod 12 through threaded rod guide 22 as molded into the top center of base 20. To front bottom base 20, a coin chute cover 24 is placed into prefabricated slots. A coin mechanism 26, illustrated with coin slot 28 and handle 30 and incorporated fully in its current design and mechanics, is then attached by way of sliding downward vertically into prefabricated slots in base 20 and further described in FIGS. 20-21.

Outer rod 32, as currently manufactured hollow with threads on both ends, is placed downward vertically over inner rod 12 and attached to base 20 by means of screwing clockwise into the threaded rod guide 22 of base 20.

Adjustable dispensing wheel 34, comprised of wheel ribs 38 on the outer edges with traditionally three open apertures, is positioned directly over rod assembly outer rod 32 to base 20 through its wheel center hole 36. Adjuster plate 40 traditionally comprised of metal in a three-wing shape with open center hole is positioned directly over outer rod 32 onto top of adjustable dispensing wheel 34. Brush off plate 42, which contains brush off plate center hole 44, is shown in reverse for illustration purposes. Brush off plate 42 is assembled with the highest section of brush off plate 42 towards the front of solar light vending machine and placed directly over adjustable dispensing wheel 34 and adjuster plate 40 and into top molded well of base 20.

A splash guard 46 has been added to the assembly configuration as an improvement to invention and is further described in FIGS. 9-12. Splash guard 46 is placed on top of brush off plate 42 with its lip extending under the top rim of coin mechanism 26. Over splash guard 46, base gasket 48 is placed. Globe 50 is then inserted on top of and into the rim of base gasket 48.

At the top rim of globe 50, top gasket 52 is placed. Over this top gasket 52, spider basket 54 is inserted. Spider basket 54 is comprised of a top flat circular ring with traditionally two, three or four downward vertical braces joined beneath. In the center of this joining, a spider basket hole 56, comprised of a center hole of a size to accommodate the passage of outer rod 32.

In its assembled position at this stage, spider basket 54 is within globe 50 with the top circular ring of spider basket 54 directly on top of top gasket 52. Inner rod 12 and outer rod 32 are at a position slightly higher than and through the center of spider basket hole 56. At this point, outer rod nut 60 is placed onto threaded end of outer rod 32 and screwed clockwise securing spider basket 54 to outer rod 32 holding globe 50 securely onto base 20 as illustrated in detail in FIGS. 6, 8 and 15. Inner rod nut 62 is an improvement to invention and secured clockwise onto threaded end of inner rod 12. This inner rod nut 62 secures inner rod 12 to outer rod nut 60 thereby holding base plate 2 and cash drawer 16 securely in base 20 to securely fastened outer rod 32, and thusly provides additional support to assembly of solar light vending machine. Inner rod nut 62 may be a standard, wing or custom nut sized to securely fasten to inner rod 12 and snugly to outer rod nut 60. This improvement to invention is more thoroughly detailed in FIGS. 6, 8 and 15.

The addition of a solar light cap 64 completes assembly of solar light vending machine of FIG. 1. Solar light cap 64 may be constructed of a size and shape so as to securely snap on over the top rim of spider basket 54. In the event that is not the case, this invention provides for the means of adding hook and loop fastener, commonly known as Velcro®, or hook to hook fastener as found in Command™ Picture Hanging Strips, for secure fastening of solar light cap 64 to solar light vending machine. FIG. 2 demonstrates addition of loop fastener 58 affixed or attached to top rim of spider basket 54 with corresponding hook fastener 72 affixed or attached to underside of solar light cap 64 as further detailed in FIG. 16. Spider basket 54 may be newly comprised of screw threads at its top rim sized to match corresponding screw threads newly incorporated into solar light cap 64 for a screw on fit of solar light cap 64 to assembled solar light vending machine.

Figure 3:
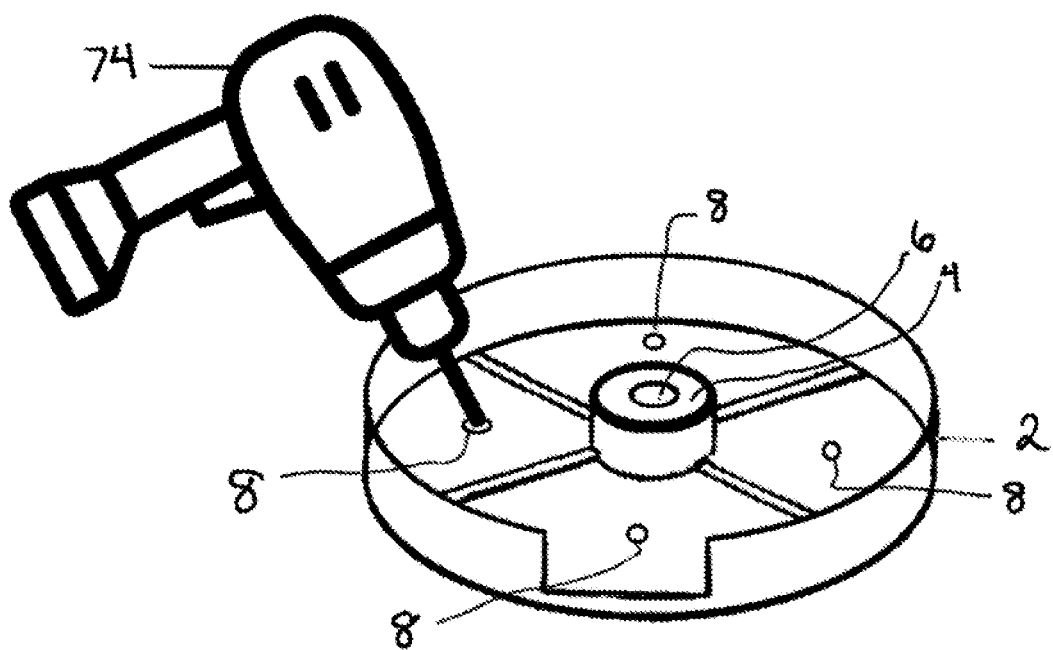
FIG. 3 is an exploded overhead view of component of the solar light vending machine of FIGS. 1 and 2 illustrating an improvement and sample method of said improvement.

FIG. 3 represents base plate 2 specifically illustrating one of many methods of incorporating drain holes 8 into lowest levels of base plate 2 in the event air or drain holes 8 are not already incorporated, as shown with base plate center hole 6 in center of threaded base plate cavity 4. Water seeks its lowest level. The addition of drain holes 8 eliminates the accumulation of moisture and its resulting damage adding to the longevity of the solar light vending machine. An improvement to invention is to ensure appropriate drain holes 8 are incorporated into the solar light vending machine. For purposes of illustration, a handheld drill with bit 74 is shown. Alternative methods of incorporating drain holes 8 into base plate 2 include drill press, punch, mold, or variations thereof in pre or post production. Drain holes 8 placed in lowest level of each section, commonly four, of base plate 2 optimize air flow and drainage of base plate 2. Currently there are base plates 2 available on the market which already contain air, and now, drain holes 8; some base plates 2 comprised of mold marks in the ideal location for drain holes 8; and, base plates 2 which are solid and will need the incorporation of drain holes 8. In the event drain holes 8 need to be created in a solid base plate 2, it is also found that positioning drain holes 8 in base plate 2 directly under drain holes 8 in cash drawer 16 provides for optimal drainage and airflow contributing to the overall longevity of the solar light vending machine. Drain holes 8 may be presented at a standard width of approximately ¼" or thereabouts, conducive to optimal drainage and airflow without compromising integrity of base plate 2.

Figure 4:
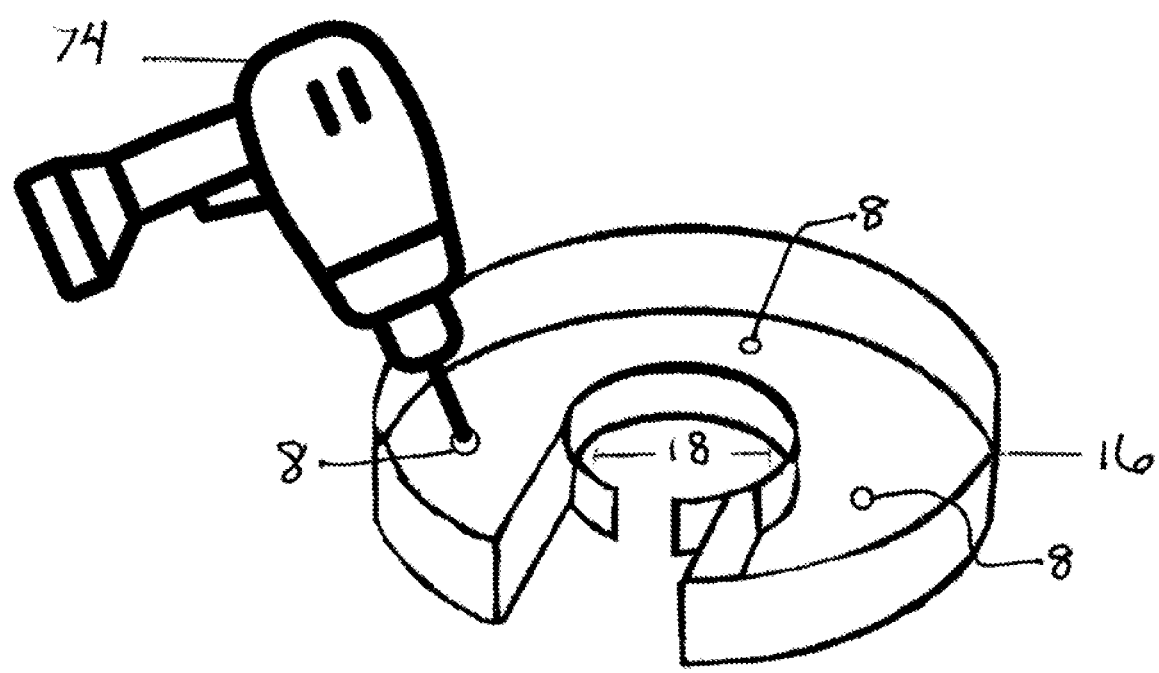
FIG. 4 is an exploded overhead view of component of the solar light vending machine of FIGS. 1 and 2 illustrating an improvement and sample method of said improvement.

FIG. 4 represents cash drawer 16 specifically illustrating one of many methods of incorporating drain holes 8 into lowest levels of cash drawer 16 in the event air or drain holes 8 are not already incorporated, as shown with cash drawer center hole 18. For purposes of illustration, a handheld drill with bit 74 is shown. Alternative methods of drilling drain holes 8 into cash drawer 16 include drill press, punch, molding or variations thereof in pre or post production. Drain holes 8 may be as few as one and three provides for optimal air flow and drainage relative to size of base 20 appropriate. Currently there are cash drawers 2 available on the market which already contain air, and now, drain holes 8; cash drawers 2 comprised of mold marks in the ideal location for drain holes 8; and, cash drawers 2 which will need the incorporation of drain holes 8. In the event drain holes 8 need to be newly created in cash drawer 16, it is found that positioning drain holes 8 in cash drawer 16 directly above drain holes 8 in base plate 2 provides for optimal drainage and airflow contributing to the overall longevity of the solar light vending machine. Drain holes 8 may be presented at a standard width of approximately ¼" or thereabouts, conducive to optimal drainage and airflow without compromising integrity of cash drawer 16.

Figure 5:
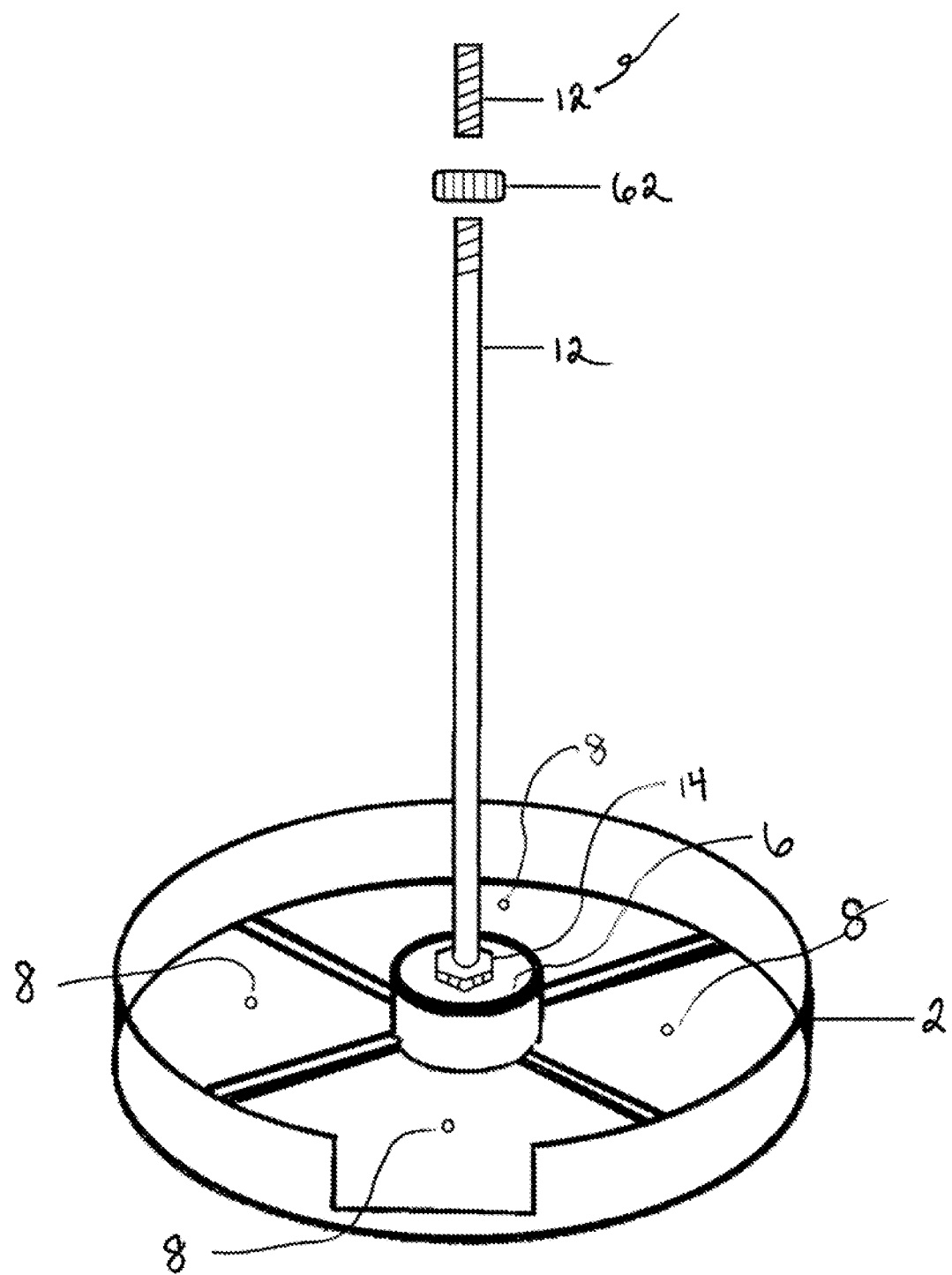
FIG. 5 is an exploded overhead view of certain components and assembly of solar light vending machine of FIG. 1.

FIG. 5 represents an illustration of the beginning assembly of the solar light vending machine utilizing an improvement to invention of modification of the length of inner rod 12 as currently utilized in traditional gumball machines. Per usual practice, base nut 14 is screwed onto one end of inner rod 12 to approximately ¾". That end of inner rod 12 is attached to base plate 2 by screwing threaded end of inner rod 12 into base plate threaded center hole 6 in top center of threaded base plate cavity 4, in the center of base plate 2. Inner rod 12 ideally positioned when the end is level or flush with the underside of screw housing in threaded base plate cavity 4, leaving underside base plate 2 threads clear for attachment to a traditional gumball machine stand 114. This may be a depth of approximately ¼" or thereabouts, dependent on depth of threaded base plate cavity 4. Base nut 14 on inner rod 12 is then tightened clockwise downwards to further secure inner rod 12 to base plate 2. Drain holes 8 are illustrated in base plate 2 as logically those would be incorporated prior to assembly as in FIG. 3.

An improvement to invention is the modification of the length of inner rod 12 and method of securing base plate 2 to base 20 of solar light vending machine to accommodate solar light cap 64. The traditional vending or gumball machine currently utilizes inner rod 12 to secure base plate 2 to base 20 by means of a cap screw 78, aka "key", through a hole in the top center of traditional cap 76, firmly screwed onto the threaded end of inner rod 12. See FIG. 7. An improvement to invention eliminates traditional cap 76 and cap screw 78; modifies construction to lower the height or length of inner rod 12 to newly attach to outer rod 32 via inner rod nut 62 to accommodate an independent solar light cap 64 as further described in FIGS. 6, 7 and 8. The method of securing inner rod 12 to outer rod 32 and, thusly, base 20 is described and illustrated further in FIGS. 6 and 8.

Inner rod 12 of a traditional vending or gumball machine must extend to a level at or to the height of globe 50 to reach cap screw 78. As traditional cap 76 and cap screw 78 are replaced by solar light cap 64, inner rod 12 should be ideally be shortened to create a clear area for the benefit of the illumination provided by LED bulb 70 of solar light cap 64. See FIGS. 13-15. Non-commercial vending gumball machines are commonly known to be available in three sizes: King, Junior and Petite. In correlation to those three sizes of machines, inner rod 12 should be shortened accordingly. King inner rod 12, currently a standard size of ¼"-20 width/thread by 13" length, is reduced to approximately a length of 11¼" or thereabouts, while maintaining or ensuring both ends are threaded ⅝" to ¾". Conversely, Junior inner rod 12 currently industry standard known as 10-24 is 10" in length, reduced to 8⅞", threaded at both ends ½"; and, Petite currently 8¼", reduced to 7¾, threaded at both ends ½". The exact length of inner rod 12 is dependent upon the depth of spider basket hole 56 in relation to top rim of spider basket 54 as further illustrated in FIG. 8. The width of inner rod 12 should be consistent with the current width of inner rod 12 commonly used for all currently produced sizes, particularly allowing for secure fastening within threaded base plate cavity 4 of base plate 2 and of a size to be inserted vertically through threaded rod guide 22 of base 20 and through the middle of hollow outer rod 32 as detailed in FIG. 6. Inner rod 12 is adapted from its current length or replaced with appropriate size. Inner rod 12 may be fully threaded or solid in the middle and threaded on both ends.

With regards to outer rod 32, it should be noted its length is in relation to drop of spider basket hole 56 from globe 50 rim. Outer rod 32 of Carousel King standard size of 7½" may or may not need a size reduction. It is found with a globe 50 height of 6¹¹⁄₁₆", spider basket hole 56 drop of 1¼" down from top rim, inner rod 12 at 11¼", standard outer rod 32 of 7½" is appropriate.

In Carousel Junior size, using globe 50 height of b 5³⁄₁₆", spider basket hole 56 drop of 1¼", inner rod 12 is reduced from 10" to 8⅞". The outer rod of 6⅝" found to be appropriate and does not need reduction.

Using a Houston Petite brand and size with a globe 50 height of 4", spider hole drop of 1½", inner rod 12 at standard of 8¼" should be reduced to 7¾", and standard outer rod 32 of 5⅛" reduced to 5".

Inner rod nut 62 may be a standard, wing or custom nut sized to securely screw/fasten to inner rod 12 and snugly over and to outer rod nut 60. Using standard rod widths currently in production, this outer rod nut 60 will be ¼"-20 for King inner rod 12 and 10-24 for Junior inner rod 12. This improvement to invention is more thoroughly detailed in FIGS. 6, 8 and 15.

Figure 6:
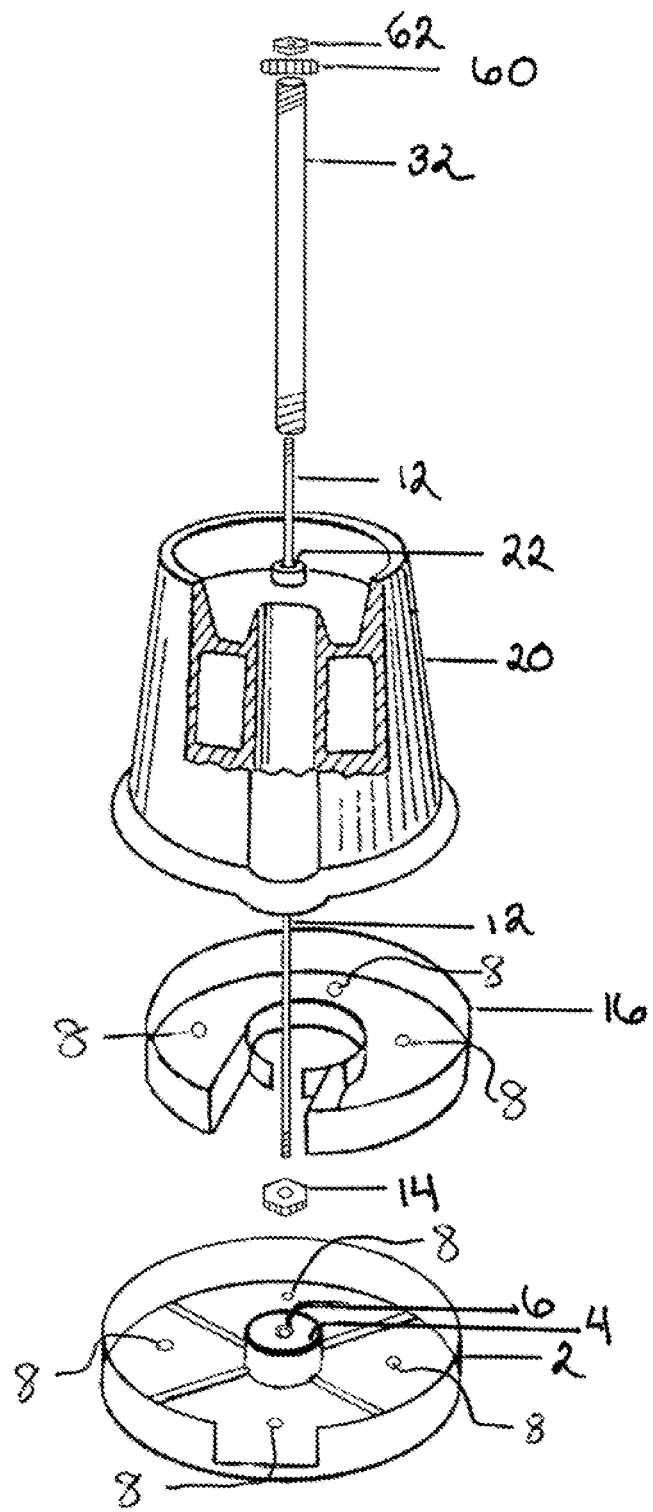
FIG. 6 is an exploded front elevational view illustrating assembly of certain of the components of the solar light vending machine of FIG. 1.

FIG. 6 illustrates certain components, improvements and partial assembly configuration of solar light vending machine of FIG. 1 specifically the method of securing base plate 2 to base 20. As previously described, inner rod 12 with base nut 14 attached to end, is screwed into base plate threaded center hole 6 of threaded base plate cavity 4 of base plate 2. Cash drawer 16 is inserted over the top of base plate 2, with inner rod 12 passing through its cash drawer center hole 18. Both base plate 2 and cash drawer 16 denote addition of drain holes 8. Base 20 of solar light vending machine is placed over cash drawer 16 and base plate 2 by means of guiding inner rod 12 upwards through threaded rod guide 22 as molded into top center of base 20. Outer rod 32, as currently manufactured as hollow with threads on both ends, is placed downward over inner rod 12 and attached to base 20 by means of screwing clockwise into threaded rod guide 22 of base 20. When assembled thus far, inner rod 12 will be raised slightly higher than outer rod 32. After the incorporation of remaining lower solar light vending machine components as described in FIGS. 1, 2 & 5, outer rod nut 60 is attached to threaded end of outer rod 32 above spider basket hole 56 of spider basket 54, see FIG. 8. Inner rod nut 62 is attached to inner rod 12 above and to outer rod nut 60, firmly securing base plate 2 to base 20 as detailed in FIGS. 2, 5, 8 and 15.

Figure 7:
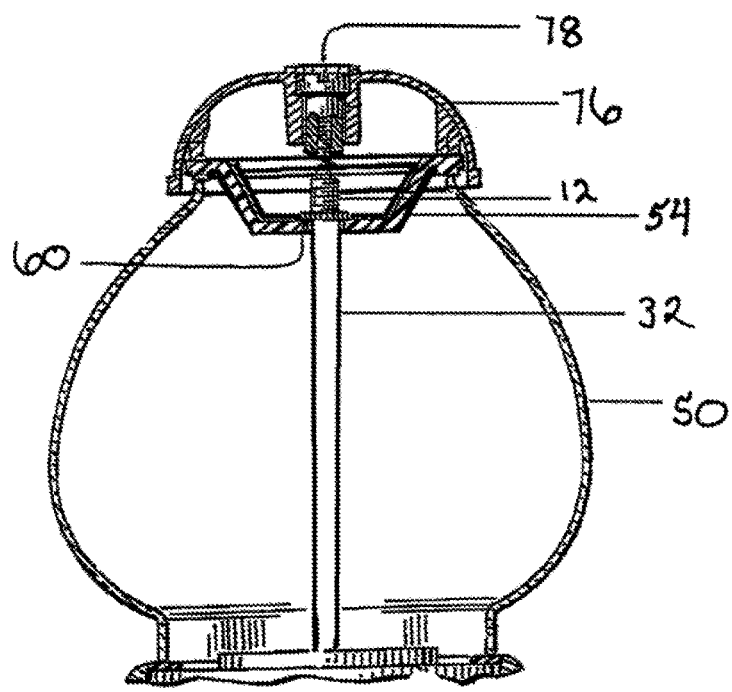
FIG. 7 is an exploded front elevational sectional view of certain traditional components, some of which are eliminated in the solar light vending machine of FIG. 1.

FIG. 7 is an illustration of, for purpose of explanation, a cross section of the topmost assembly of a traditional vending or gumball machine in its pre-converted to solar state containing certain components to be eliminated. In this example of pre-improvement, inner rod 12 has not been reduced in length and is secured at the top to base plate 2 to base 20 by means of a key or cap screw 78 through a vertical hole in the top center of traditional cap 76; which is firmly screwed onto threaded end of inner rod 12. An improvement to invention eliminates traditional cap 76 and cap screw 78;

modifies construction to lower height or length of inner rod 12 to newly attach to outer rod 32 via inner rod nut 62 to accommodate an independent solar light cap 64 as described in FIGS. 5, 6, 8 and 15.

Figure 8:
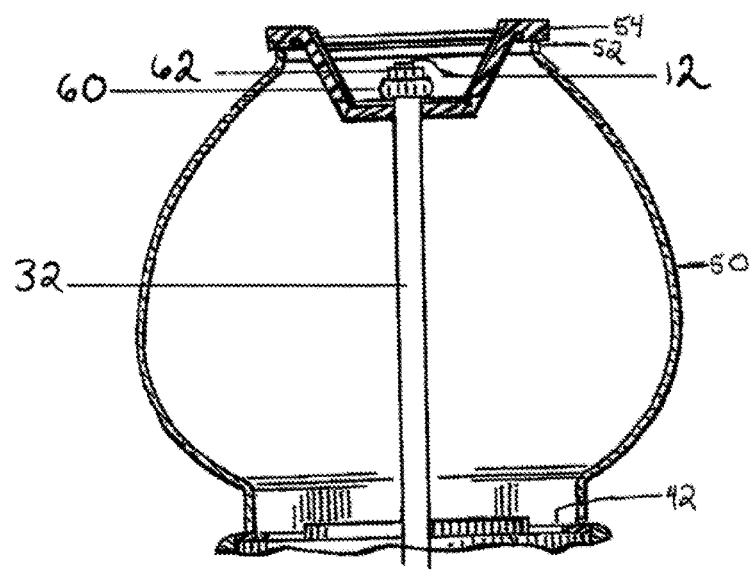
FIG. 8 is an exploded front elevational sectional view illustrating certain components of the solar light vending machine of FIG. 1 and assemblage thereof.

FIG. 8 is an illustration of, for purpose of explanation, a cross section of certain components of the topmost assembly of solar light vending machine reflecting an improvement to invention. In assembled position, spider basket 54, with its spider basket hole 56, is within globe 50 with the top circular ring of spider basket 54 directly on top of top gasket 52. Reduced inner rod 12 and outer rod 32 are at a position slightly higher than and through the center of spider basket hole 56. Outer rod nut 60 is placed onto threaded end of outer rod 32, on top of spider basket hole 56, and screwed clockwise securing spider basket 54 to outer rod 32 holding globe 50 securely onto base 20. See also FIG. 2. Inner rod nut 62 is an improvement to invention and secured clockwise onto threaded end of inner rod 12. Inner rod nut 62 secures inner rod 12 to outer rod nut 60, secured to outer rod 32, and thereby securing base plate 2 through base 20 to the securely fastened outer rod 32. Unscrewing inner rod nut 62 when solar light vending machine assembled will result in ability to raise solar light vending machine as a whole, exposing cash drawer 16 and base plate 2, while globe 50 remains firmly attached to base 20. This method of securing inner rod 12 to outer rod 32 results in a strong and stable assemblage of solar light vending machine without undue pressure placed on globe 50.

Inner rod nut 62 may be a standard, wing or custom nut sized to securely screw/fasten to inner rod 12 and snugly over and to outer rod nut 60. Outer rod nut 60, sized to fit outer rod 32, may be of standard size as currently produced or custom designed with appropriate height and diameter ratio to inner rod nut 62. Inner rod nut 62 and outer rod nut 60 should be of a size whereby spider basket hole 56 is firmly held by outer rod nut 60; and, inner rod nut 62 firmly attaches on top of outer rod nut 60.

FIG. 9 illustrates an improvement to invention whereby a splash guard 46 is added to the assembly configuration to provide precipitation and debris deflection to coin mechanism 26 while maintaining the vending machine's classic design. As coin mechanism 26 is comprised of metal gears and parts, it is more susceptible to the weather related deterioration. While the splash guard 46 is not necessary to said invention, it is an inexpensive and easily manufactured improvement providing additional protection to coin mechanism 26 deflecting precipitation and debris as experienced in an outdoor environment. This splash guard 46 most particularly useful for the larger size known as King. It is found that Junior and Petite sizes generally do not need the addition of a splash guard 46. Splash guard 46 may be constructed of thin plastic or other similarly pliable material. By way of example, splash guard 46 may be constructed with thin but rigid plastic, including, but not limited to, that which is commonly found as bottom support in currently available recycle bags approximately 1 mm thick. The size and shape of splash guard 46 is directly in proportion to the size of coin mechanism 26 so as to be placed on base 20, on top of brush off plate 42, with its lip extending under the top rim of coin mechanism 26. Over splash guard 46, base gasket 48 is placed. Globe 50 is then inserted on top of and into rim of base gasket 48 as illustrated in FIG. 12. The downward pressure of globe 50 in assembled solar light vending machine is more than adequate to hold splash guard 46 firmly in place. Alternatively, splash guard 46 may be mounted or affixed to base gasket 48 if so desired. For purpose of further explanation and not meant to limit improvement dimensions, referring to a gumball vending machine known as King sized, splash guard 46 may be 91 mm wide with a front lip extension of 12 mm; side depth of 30 mm with a curve to match base gasket 48.

FIG. 10 is an illustration of an overhead view of splash guard 46 as placed or affixed under base gasket 48.

FIG. 11 is an illustration of an underside view of splash guard 46 as placed or affixed under base gasket 48.

FIG. 12 is an illustration of certain components of partial base 20 assembly. Here adjustable dispensing wheel 34 with adjuster plate 40 is placed in base 20 with brush off plate 42 placed on top with all centered over threaded rod guide 22 and outer rod 32. Splash guard 46 is placed on base 20, on top of brush off plate 42, with its lip extending under top rim of coin mechanism 26. Over splash guard 46, a base gasket 48 is placed. Globe 50 is then inserted on top of and into the rim of base gasket 48 as illustrated in FIG. 2.

Figure 13:
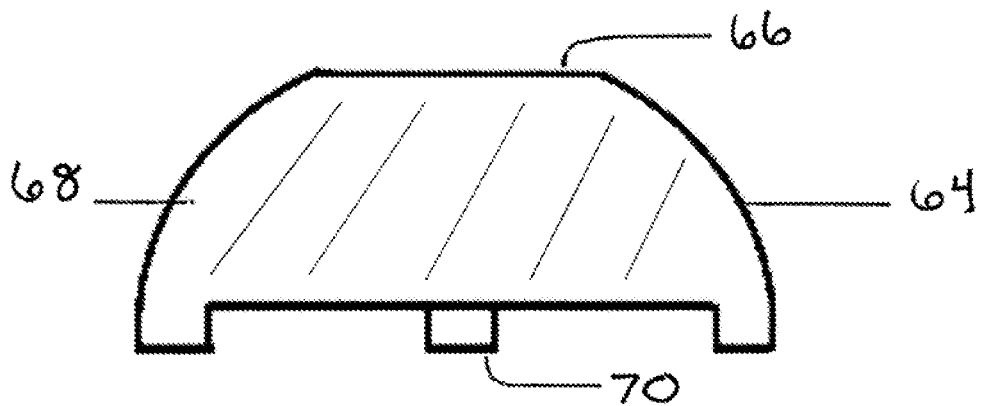
FIG. 13 is a front elevational sectional view illustrating component of invention of FIG. 1.

FIG. 13 is a front elevational sectional view representing a solar light cap 64 which may be used with the invention consisting basically of a solar panel 66 (aka amorphous solar panel) mounted on top of solar outer housing 68 which encompasses a rechargeable battery, a photo-resistor arranged to recharge the battery and power the LEDs, and light emitting diode(s) or LED bulb 70 facing downward. Here a solar light cap 64 is used whereby the solar outer housing 68 is constructed with solar outer housing 68 extending lower than the interior components thereby creating a rim or outside ring. The inside measurement of the circular rim should be of a size slightly larger than outside top rim of spider basket 54. The inner under housing of solar light cap 64 is recessed approximately ⅛" to ¼", or thereabouts deep to allow for a secure snap-on fit to spider basket 54. As an example, solar light cap 64 for a King-sized machine is of circular shape with an interior measure of 4" across and recessed ⅛" below the outer housing diameter of 5", whereby a lip is formed. The overall outside height of solar light cap 64 is 1¼". The solar outer housing 68 and lower lip may be of any dimension and style pleasing to overall design of solar light vending machine while allowing for a secure snap-on installation, easy access and results in virtually sealing the interior of globe 50 from precipitation and debris associated with outdoor environments, protecting its contents. Solar light cap 64 constructed such that inner dimension of spider basket is incorporated into configuration for snap-on fit.

Figure 14:
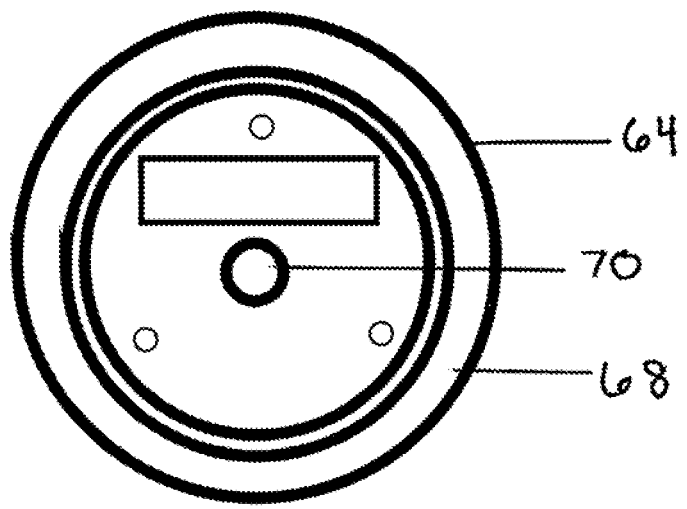
FIG. 14 is an underside view illustrating component of invention of FIG. 1.

FIG. 14 is an underside view representing a solar light cap 64 which may be used with the invention as described in FIG. 13. The inner housing is recessed from the outer housing in a circular shape of a diameter slightly larger than spider basket 54 (See FIGS. 15 and 16) and at a depth of approximately ⅛". LED bulb 70 is shown in the bottom center of solar light cap 64.

Figure 15:
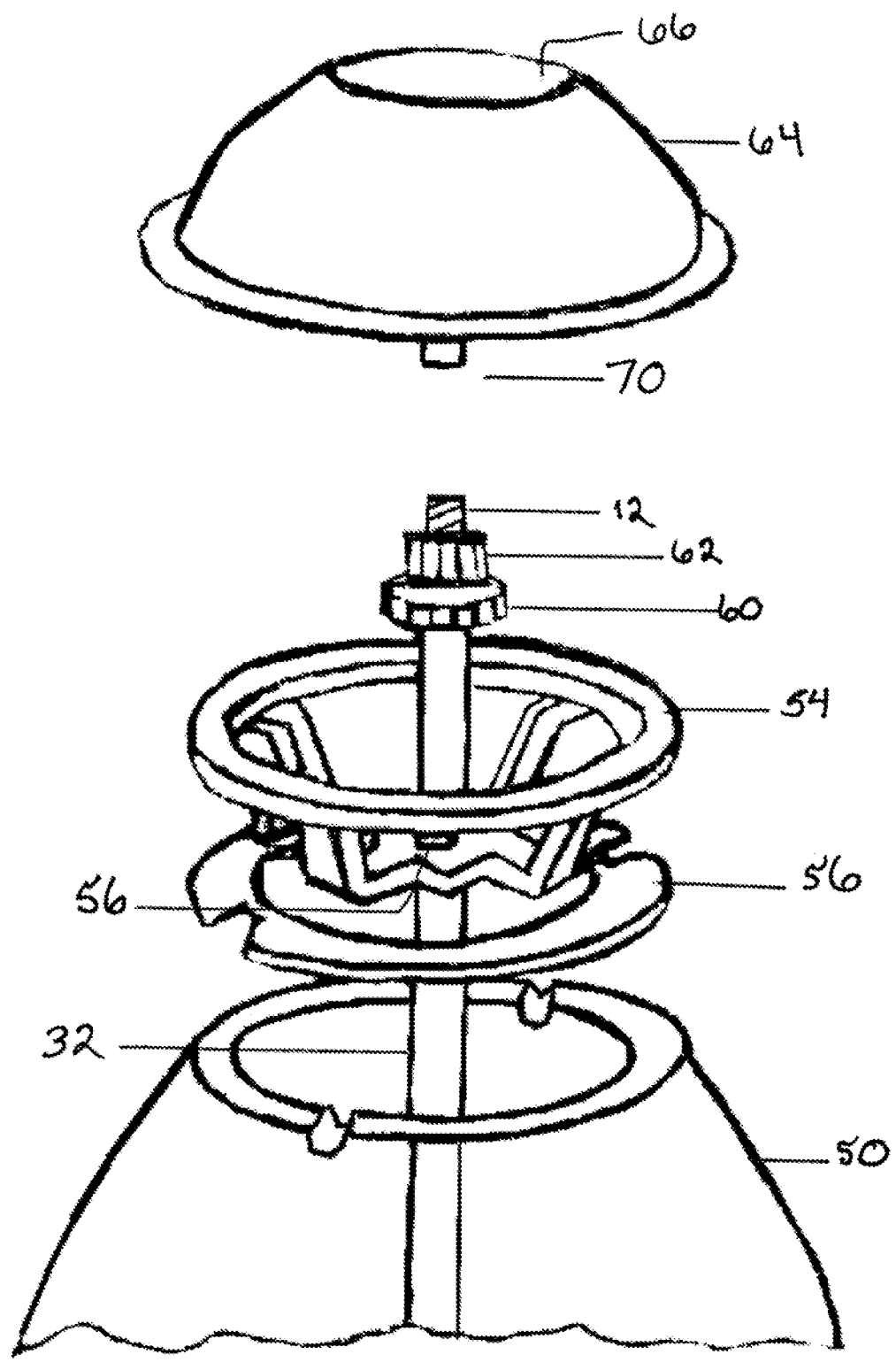
FIG. 15 represents an exploded side view illustrating assembly of certain components of solar light vending machine of FIG. 1.

FIG. 15 is an exploded side view illustrating assembly of certain components of solar light vending machine of FIG. 1, specifically the snap-on method of attachment of solar light cap 64 as described in FIGS. 13 and 14. Globe 50 is as seated in base 20 on top of base gasket 48 and assembled lower components. A top gasket 52 is placed on top of globe 50. Spider basket 54 is inserted with inner rod 12 and outer rod 32 vertically through and slightly above center spider basket hole 56. Outer rod nut 60 is attached to outer rod 32. Inner rod nut 62 is attached to inner rod 12. Solar light cap 64 is lowered onto top rim of spider basket 54. Note: battery should be inserted and battery tab, if present, should be removed or pulled prior to attachment of solar light cap 64.

Figure 16:
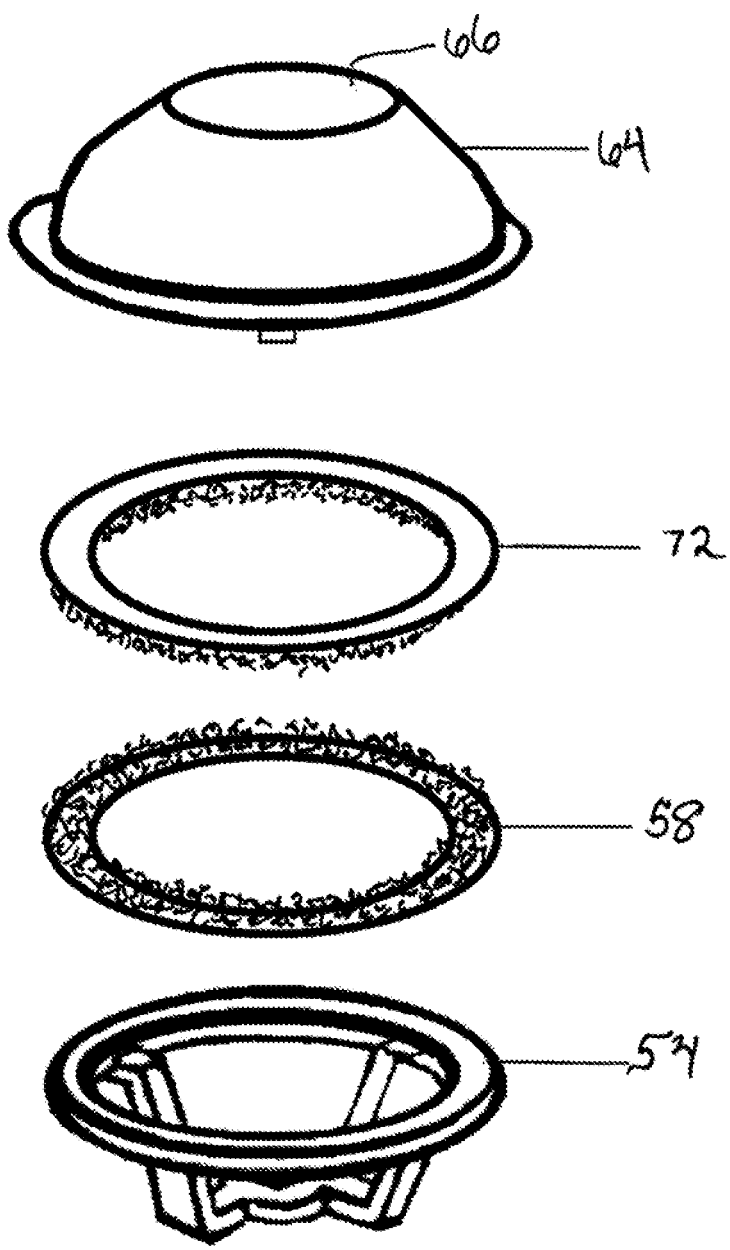
FIG. 16 is a side view illustrating alternative components and assemblage thereof as may be used as component of invention of FIG. 1.

FIG. 16 is a side view of alternative components and assemblage thereof of improvement to invention, specifically the means and components by which solar light cap 64, as described in FIGS. 13 and 14, is attached to solar light vending machine. Here a solar light cap 64 is used whereby the light housing is constructed such that the lower under unit is relatively flush with or to its rim. In this instance, an improvement to invention utilizes a hook fastener 72 and loop fastener 58 system commonly known as Velcro® to consist of a hook fastener 72 and loop fastener 58 constructed, fabricated, cut, stamped, or by most reasonable means, the dimensions equal or approximate to the top rim of spider basket 54. Conversely, a hook fastener 72 which attaches to a hook fastener 72 method may replace the hook fastener 72 to loop fastener 58 method. Spider basket 54 is commonly manufactured in three standard sizes known as King, Junior and Petite, the exact dimensions of which may vary slightly within those three sizes. As a general guide, the ring or donut shape of hook fastener 72 and loop fastener 58 are sized at approximately: King—4" outer diameter, 3½"inside diameter, ½" circular width; Junior—3⅛" outer diameter, 2⅞" inside diameter, ¼" circular width; and, Petite—2½" outer diameter, 2³⁄₁₆" inside diameter, ⁵⁄₁₆" circular width. It is noted that if the top rim of spider basket 54 contains raised mold pegs, those should be removed for a level upper rim.

For purposes of example and consistency herein, loop fastener 58 is attached to the top rim of spider basket 54 with adhesive tolerant to outdoor conditions. Conversely hook fastener 72 is attached to the center underside of solar light cap 64 with adhesive tolerant to outdoor conditions. Solar light cap 64 with hook fastener 72 is then lowered on top of assembled solar light vending machine joining to loop fastener 58 as affixed to top rim of spider basket 54. This method provides for the secure yet accessible fit of solar light cap 64 and virtually seals the interior of globe 50 from precipitation and debris associated with outdoor environments. As hook fastener 72 and loop fastener 58 are not visible when solar light vending machine fully assembled, the color of same is flexible and may be best determined by color or finish of base 20 or solar light cap 64.

It should be noted that solar light cap 64 is ideally of a size, shape and style pleasing to overall design of solar light vending machine. By way of one example, solar light cap 64 may be of a design which closely resembles the size and shape of the no longer needed traditional cap 76 as referenced in FIG. 7, and appropriate in aesthetic size to size of globe 50.

Figure 17:
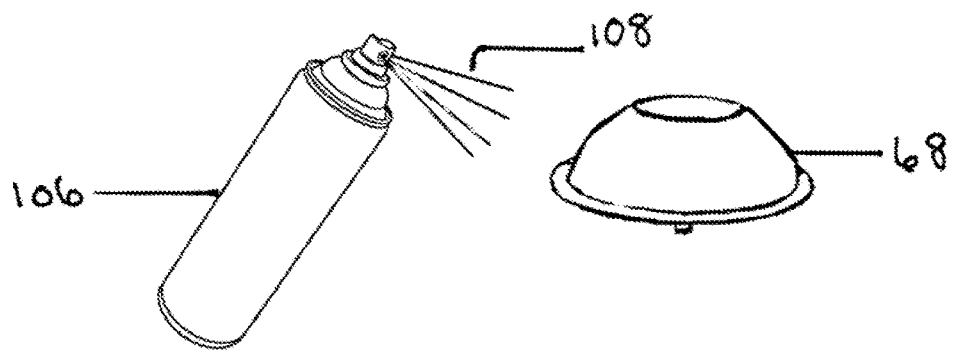
FIG. 17 is a side view of illustrating an improvement and sample method of said improvement of solar light vending machine of FIG. 1.

FIG. 17 illustrates an improvement and sample method of said improvement of solar light vending machine, specifically solar light cap 64 of FIG. 1 depicting the addition of an exterior paint/finish or specialty coating 110, referencing clear coats and color, to the housing of solar light cap 64 to compliment or match the color and finish of base 20 of solar light vending machine of FIG. 1. Where an exterior finish or complimentary exterior color is already incorporated into the specifications of the solar light cap 64 production, the addition of an exterior paint/finish or specialty coating 110 will not be necessary. Spray paint can 108 is illustrated for demonstration purposes and meant to encompass all variations of application and manufacturing methods, including power coating, baking, dipping, molding, etc. of an exterior paint/finish or specialty coating 110 thereof in pre or post production. It is noted that standard colors currently offered in traditional gumball machines are pleasing in outdoor environments. It is also found that vivid colors of fuchsia, bright blue, metallic gold, greens and reds are aesthetically pleasing in all climates and regions of world. An improvement to invention is to color customize base 20 and solar light cap 64 to a particular product brand or theme.

Figure 18:
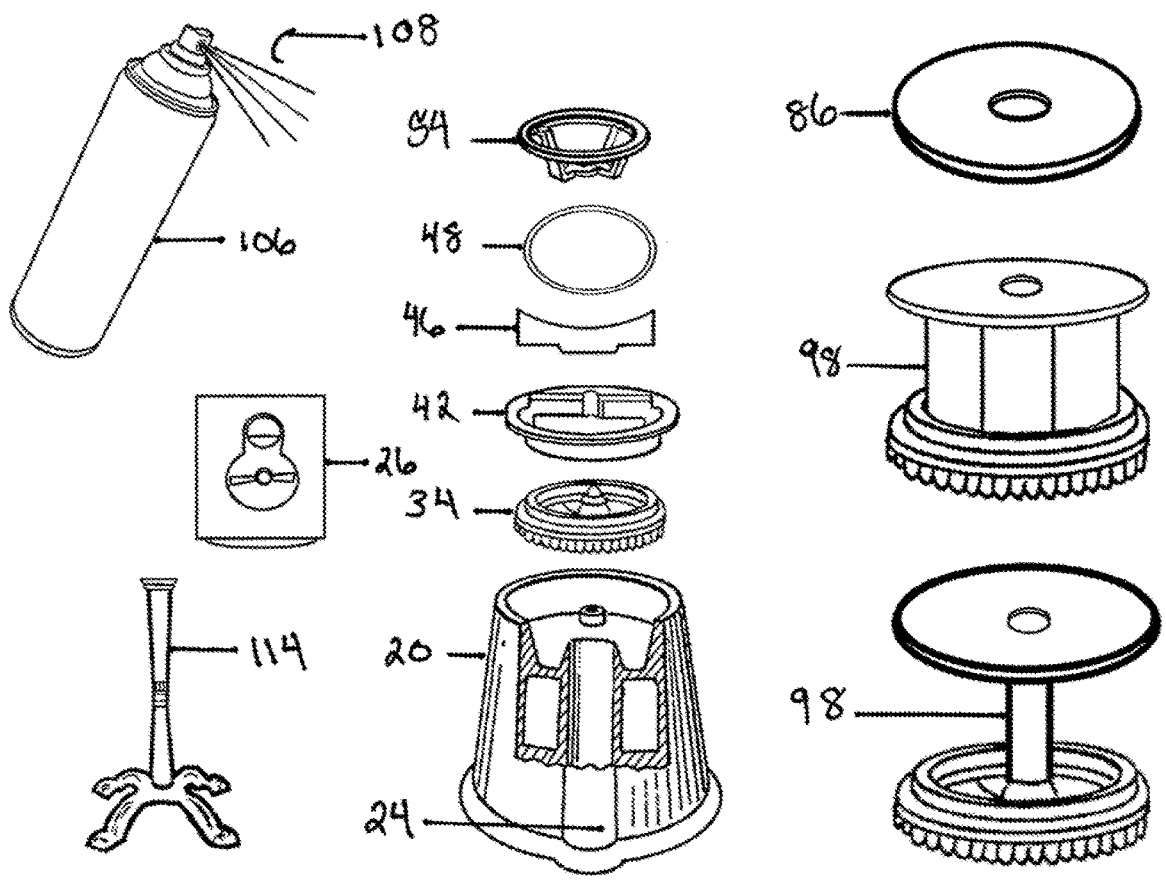
FIG. 18 is a side view illustrating an improvement and sample method of said improvement of solar light vending machine of FIG. 1.

FIG. 18 illustrates an alternative improvement and sample method of said improvement of solar light vending machine, specifically spider basket 54 and brush off plate 42 depicting the addition of an exterior paint/finish or specialty coating 110, referencing glitter, simulated chrome and/or color, to spider basket 54 and brush off plate 42 to compliment or match the color and finish of base 20 of solar light vending machine of FIG. 1. Currently spider basket 54 and brush off plate 42 are of molded plastic and grey in color. While not a necessary improvement, it should be noted the addition of an exterior paint/finish or specialty coating 110 further enhances light reflection/refraction of solar light provided by solar light cap 64. The addition of an exterior paint/finish or specialty coating 110 to base 20, splash guard 46, base gasket 48, stand 114 and/or coin mechanism 26, and described in FIG. 2, platform disc with center hole 86, described in FIG. 22 and turntable 98, described in FIGS. 23-25, for aesthetic, branding or theme purposes is an improvement to invention. Coin mechanism 26 found to be particularly enhanced with a metallic gold finish. Spray paint can 108 illustrated for demonstration purposes and meant to encompass all variations of application and manufacturing methods, including power coating, baking, dipping, molding, etc. of exterior paint/finish or specialty coating 110 thereof in pre or post production.

Figure 19:
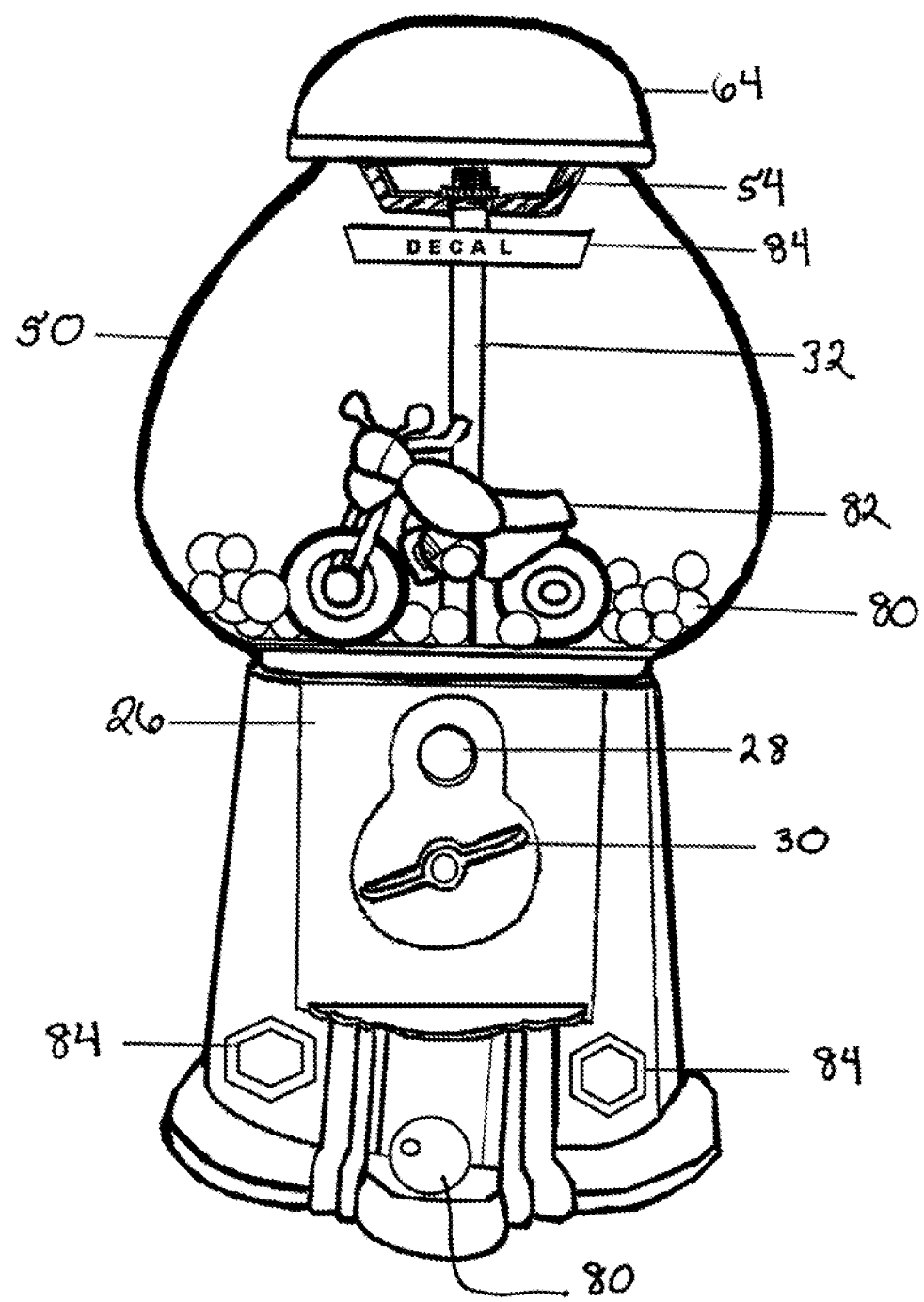
FIG. 19 is a front elevational view illustrating an improvement to solar light vending machine of FIG. 1 and as constructed in accordance with the principles of the invention.

FIG. 19 illustrates solar light vending machine in an assembled and ready for use state illustrating the addition of non-perishable fill 80 within globe 50. Traditionally vending machines are filled with confectionary known as gumballs. As gumballs are perishable, prone to melting or disintegration when moist and, by virtue of their composition, may attract insects or pests, alternative non-perishable fill 80 is recommended. Fill 80 is decorative in nature. The solar light vending machine is a working vending machine and Fill 80 may be of a size approximately the size of a common gumball, approximately 0.62 inch or 16 mm, in order to easily pass through the adjustable dispensing wheel 34, including, but not limited to, small marbles, rubber balls, dice, etc. Fill 80 may also be purely decorative to include virtually any representation of leisure activities and brand associations. Fill 80 may be of a size larger than that of adjustable dispensing wheel 34, thereby rendering Fill 80 for decorative purposes only; or combined with smaller fill 80, that of which will drop through adjustable dispensing wheel 34. Examples of Fill 80 are: golf balls 86 golf tees; fishing lures and bobbers; miniature sporting goods balls, including, but not limited to, soccer, football, basketball, baseball, hockey pucks; Squinkies® with their rubber figures in plastic balls reminiscent of toy vending machines; miniature figurine(s) 82 of brand products, sporting teams, action heroes, to name a few.

An improvement to invention may also include the addition of a figurine 82 of appropriate size attached to brush off plate 42 or outer rod 32 representing a promotional or product, including, but not limited to, miniature John Deere® tractor; Harley Davidson® motorcycle; NASCAR® race car; action hero; sports team; etc., for brand promotional purposes, while appealing to collector of same. Accordingly, fill 80 may be of similar or complimentary composition including, but not limited to, John Deere® green and yellow tractor figurine 82 attached to brush off plate 42 with fill 80 of yellow and/or green marbles; Batman superhero figurine 82 attached to outer rod 32 with fill 80 of blue marbles. Figurines 82 particularly appropriate for outdoor settings and branding may include miniature snowmobile, wave runner, boat, motorcycle, atv, tractor, car, truck and super heroes; and, fill 80 appropriate to theme, including, but not limited to, blue marbles for water, yellow or green for fields, white for snow, black for pavement, etc. Fill 80 for sports teams' brands may be miniature sporting goods balls, including, but not limited to, soccer, football, basketball, baseball and hockey pucks for primarily decoratively themed purposes. Further, decals 84 manufactured for outdoor use may be added to base 20 and globe 50 in representation of brand or theme. Fill 80, figurine 82 and decals 84 referenced are mentioned as examples, and not meant to be limiting in any way to scope of fill 80, figurine 82 and decals 84 as a myriad of combinations are possible.

An improvement to invention of figurine 82 is to attach a swivel ring 116 to figurine 82 which allows figurine 82 to swivel for placement into globe 50 by means of swivel ring 116 being placed over outer rod 32. This method provides for figurine 82 to be held to outer rod 32 in position, while retaining the ability to swivel into a position to easily insert into globe 50 particularly useful when figurine 82 is horizontally wider than globe 50 opening when upright. Prototypes of this improvement to invention include use of Bulldog Hardware® Zinc Plated Screw Eyes 1⅜" (34.9 mm), its screw threads inserted into figurine 82, the ring portion being placed over outer rod 32. See also FIG. 27.

Solar light vending machine components illustrated in FIG. 19 are described as: a base 20 to which a globe 50 is attached by means of an inner rod 12 and outer rod 32 secured to a spider basket 54 with outer rod nut 60 and inner rod nut 62 respectively. Coin mechanism 26 is as attached to base 20. Solar light cap 64 is attached via snap-on or hook fastener 72 to loop fastener 58 method. Non-perishable fill 80 and figurine 82 inside globe 50, as attached with swivel ring 116; decals 84 on base 20 and globe 50.

Figure 20:
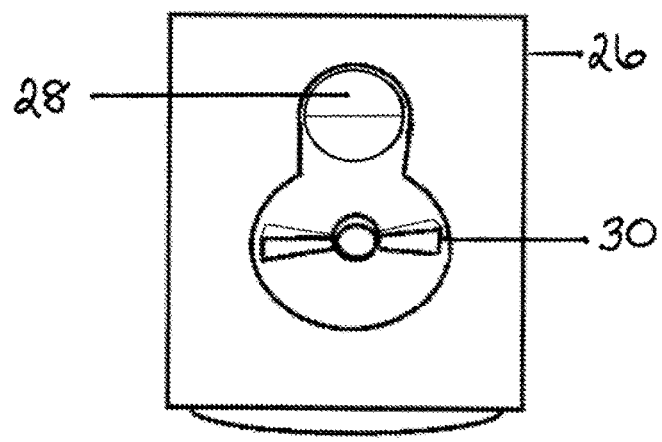
FIG. 20 is a front elevational view illustrating a traditional component of the solar light vending machine of FIG. 1.
Figure 21:
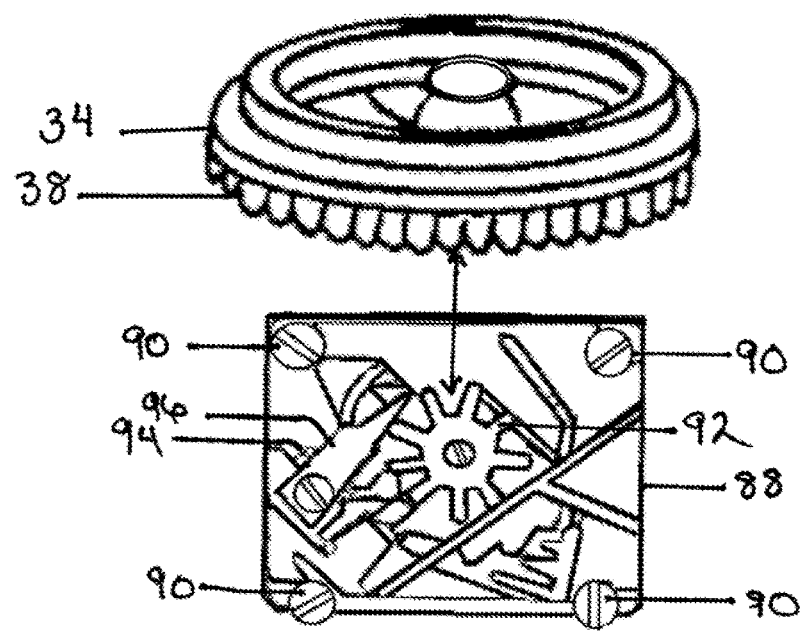
FIG. 21 is a front elevational view illustrating the reverse or inside view of the traditional component of FIG. 20 of the solar light vending machine of FIG. 1.

FIG. 20 is a front view of coin mechanism 26 as currently manufactured in metal containing a coin slot 28 and handle 30 which controls the rotation of sprocket 92 illustrated in FIG. 21.

FIG. 21 is the reverse or interior of view of coin mechanism 26 comprised of a metal retaining plate 88, screws 90, sprocket 92, spring 94 and restricting dog arm 96. This manually operated coin mechanism 26 includes a handle 30 which is turned clockwise when a coin is inserted into coin slot 28 as shown in FIG. 20. When handle 30 is turned, the fingers of sprocket 92 engage and turn the wheel ribs 38 of adjustable dispensing wheel 34 a one-third rotation allowing the passage of fill 80 downward and behind coin chute cover 24. It is noted that in the event fill 80 is too large to drop through adjustable dispensing wheel 34, coin mechanism 26 continues to accept coins allowing clockwise rotation of handle 30 turning sprocket 92, rotating adjustable dispensing wheel 43. This method results in solar light vending machine retaining its ability to act as a bank. This coin mechanism is incorporated fully and its entirety. It should be noted that removal of spring 94 will provide for free or coinless spinning. Coin mechanism 26 will continue to accept a coin, however, a coin will not be necessary in order to turn handle 30.

Figure 22:
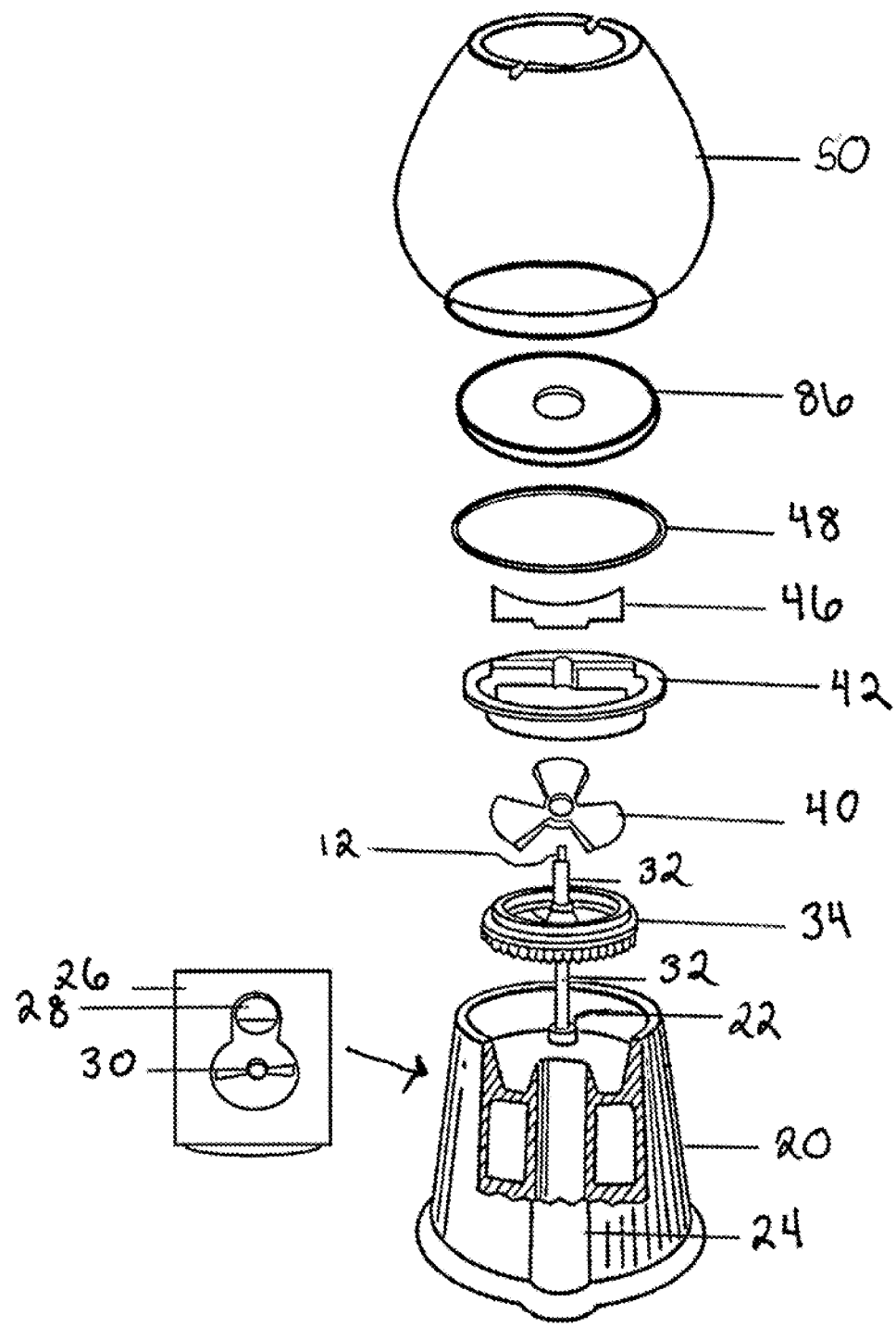
FIG. 22 is an exploded front elevational view illustrating an improvement to solar light vending machine and assembly of certain components of FIG. 1.

FIG. 22 illustrates an improvement to invention in the event fill 80 is too large to drop through adjustable dispensing wheel 34, a platform disc with center hole 86 is added to the top of brush off plate 42 over outer rod 32. Platform disc with center hole 86 acts as a barrier between fill 80 in globe 50 and brush off plate 42 opening thereby reducing the volume of fill 80 needed. The addition of a platform disc with center hole 86 enables solar light vending machine to continue its function as a bank while ensuring functionality of coin mechanism 26.

Platform disc with center hole 86 should be of a width no larger than the lower opening of globe 50 in order that globe 50 may fit securely onto base gasket 48 with platform disc with center hole 86 contained within globe 50, its center hole large enough to insert over outer rod 32. Platform disc with center hole 86 may be 4¼" diameter for a King size machine, 3¼" diameter for Junior machine, or slight variations thereof, with its center hole a diameter to allow clearance of outer rod 32. Platform disc with center hole 86 may be comprised of plastic or metal of a silver shiny finish and/or treated with an exterior paint/finish or specialty coating 110 per FIG. 18. It is found that a commonly available and inexpensive DVD-CD is a cost-effective option to use as a platform disc with center hole 86. Its shiny surface and size of 4¾" diameter with a ½" center hole fits perfectly in King size machine.

Certain components and assembly of solar light vending machine illustrated in FIG. 22 are described as: a base 20 to which coin chute cover 24 and coin mechanism 26, coin slot 28, handle 30, are attached. Outer rod 32 is screwed into threaded rod guide 22 of base 20. Adjustable dispensing wheel 34, adjuster plate 40 and brush off plate 42 are assembled downward over outer rod 32. Splash guard 46 is inserted under front lip of coin mechanism 26. Base gasket 48 is added to base 20. Platform disc with center hole 86 is placed on top of brush off plate 42. Globe 50 is placed on top of base gasket 48. Remaining assemblage continues per FIGS. 2, 8, 15 and 16.

Figure 23:
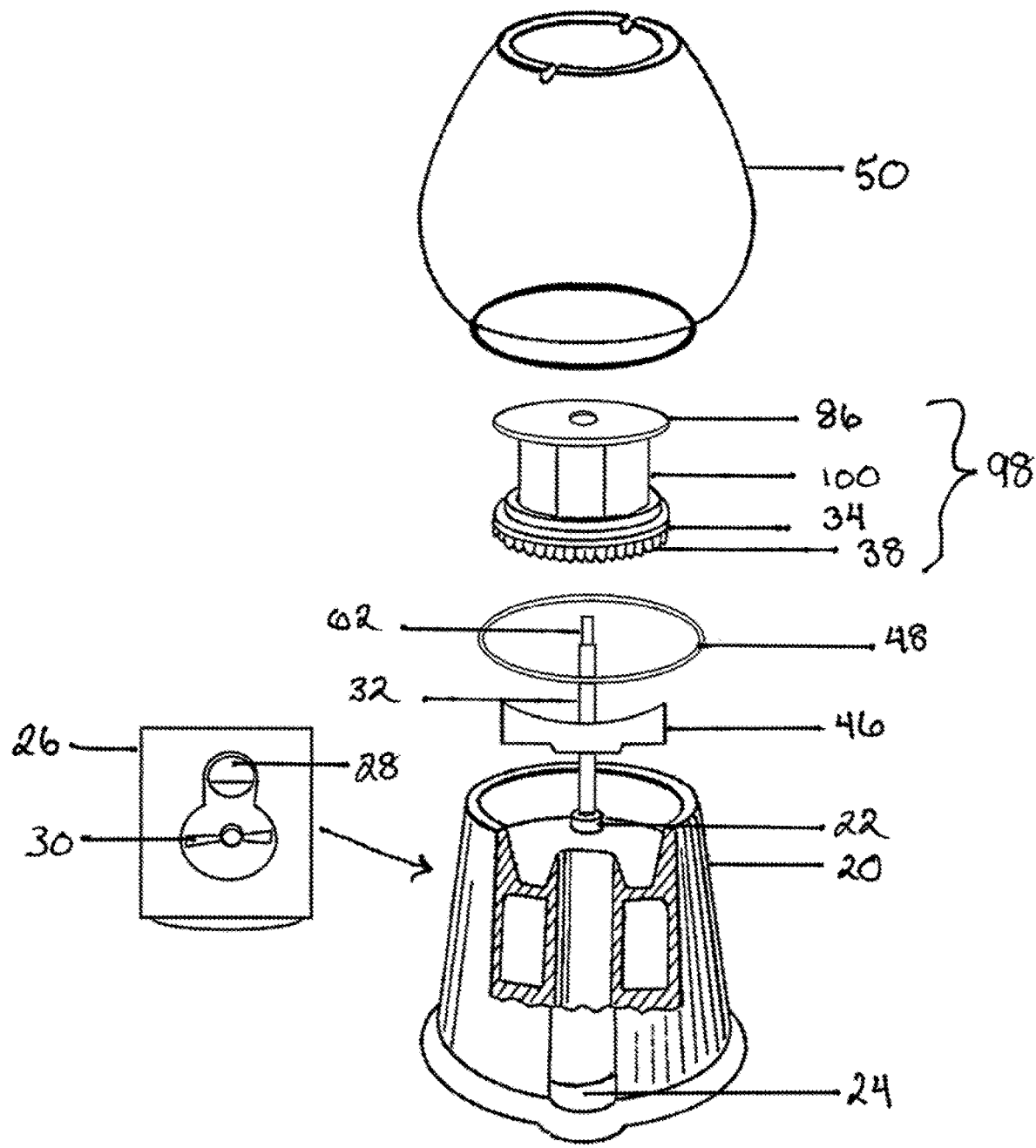
FIG. 23 is an exploded front elevational view illustrating an improvement to solar light vending machine and assembly of certain components of FIG. 1.

FIG. 23 illustrates an improvement to invention of a turntable 98. Turntable 98 is comprised of a platform disc with center hole 86 attached to platform riser with center hole 100 attached to adjustable dispensing wheel 34. This improvement allows for a diorama 106, as further described in FIG. 26, to be attached to turntable 98 creating an enjoyable scene within globe 50. As handle 30 of coin mechanism 26 is turned clockwise, its attached sprocket 92 engages with wheel ribs 38 of adjustable dispensing wheel 34 rotating turntable 98 counterclockwise one-third. This improvement enhances the enjoyment of the solar light vending machine in that the user inserts a coin and is rewarded with a rotating scene. It is noted improvements to solar light vending machine may include the ability of solar to rotate the platform disc and/or handle 30 or coin mechanism 26.

Platform disc with center hole 86, as described in FIG. 22, is attached to platform riser with center hole 100 of appropriate height in order that when attached to adjustable dispensing wheel 34, platform disc with center hole 86 is of a height to be clearly seen in globe 50 when fully assembled. Platform riser with center hole 100 may be of any diameter less than or equal to the width of adjustable dispensing wheel 34 and its center hole large enough to allow passage of outer rod 32. It is found that a commonly available and inexpensive electrical conduit box of 3½" diameter×1½" high is a cost-effective option to use as a platform riser with center hole 100 in a King size machine. Its construction includes a centered hole and its fabricated screw threads allow for easy attachment to adjustable dispensing wheel 34 by means of its screw. In addition, its metal or hard plastic construction conducive to outdoor elements. When constructed, turntable 98 approximately 2½ to 2¾" in height for the King machine and correspondingly smaller for the Junior and Petite machines respectively.

Certain components and assembly of solar light vending machine illustrated in FIG. 23 are described as: a base 20 to which coin chute cover 24 and coin mechanism 26, coin slot 28, handle 30, are attached. Outer rod 32 is screwed into threaded rod guide 22 of base 20. Splash guard 46 is inserted under front lip of coin mechanism 26. Base gasket 48 is added to base 20. Turntable 98 is inserted into base 20 over outer rod 32. Globe 50 is placed on top of base gasket 48. Remaining assemblage continues per FIGS. 2, 8, 15 and 16. With this method, brush off plate 42 is not used as its current design interferes with platform riser with center hole 100, further detailed in FIG. 25. Globe 50 is cradled in base 20 and base gasket 48.

Figure 24:
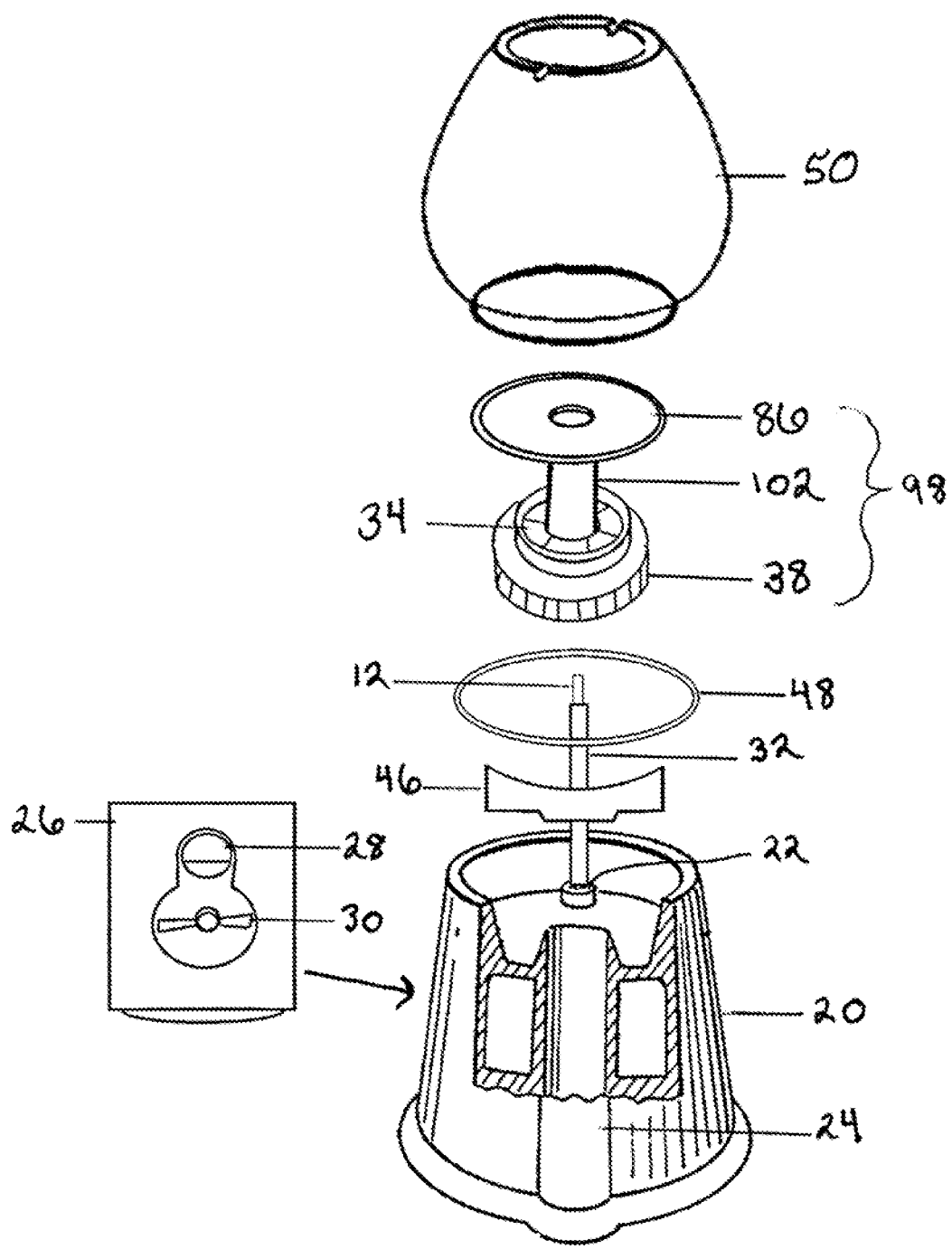
FIG. 24 is an exploded front elevational view illustrating an improvement to solar light vending machine and assembly of certain components of FIG. 1.

FIG. 24 illustrates an improvement to invention of turntable 98. Turntable 98 is comprised of a platform disc with center hole 86 attached to pipe riser 102 attached to adjustable dispensing wheel 34. This improvement offers an alternative to platform riser with center hole 100 while still allowing for a diorama 106, as further described in FIG. 26, to be attached to turntable 98 creating an enjoyable scene within globe 50. As described in FIGS. 21-23, as handle 30 of coin mechanism 26 turned clockwise, its attached sprocket 92 engages with wheel ribs 38 of adjustable dispensing wheel 34 rotating turntable 98 counterclockwise one-third. Platform disc with center hole 86, as described in FIG. 22, is attached to a pipe riser 102 of appropriate height in order that when attached to wheel center hole 36 of adjustable dispensing wheel 34, platform disc with center hole 86 is of a height to be clearly seen in globe 50 when fully assembled. Pipe riser 102 is a hollow tube or pipe, its diameter large enough to allow passage of outer rod 32 while fitting snugly into wheel center hole 36 of adjustable dispensing wheel 34. It is found that a commonly available ½" pipe cut to approximately 2½ to 2¾" in length is a cost-effective option to use as a pipe riser 102 in a King size machine. When constructed, turntable 98 is approximately 2½" to 2¾" in height for the King machine and correspondingly smaller for the Junior and Petite machines respectively.

Certain components and assembly of solar light vending machine illustrated in FIG. 24 utilizing pipe riser 102 assembly of turntable 98 are described as: a base 20 to which coin chute cover 24 and coin mechanism 26, coin slot 28, handle 30, are attached. Outer rod 32 is screwed into threaded rod guide 22 of base 20. Splash guard 46 is inserted under front lip of coin mechanism 26. Base gasket 48 is added to base 20. Turntable 98 is inserted into base 20 over outer rod 32. Globe 50 is placed on top of base gasket 48. Remaining assemblage continues per FIGS. 2, 8, 15 and 16. With this method, brush off plate 42 is not utilized. Globe 50 is cradled in base 20 and base gasket 48.

Figure 25:
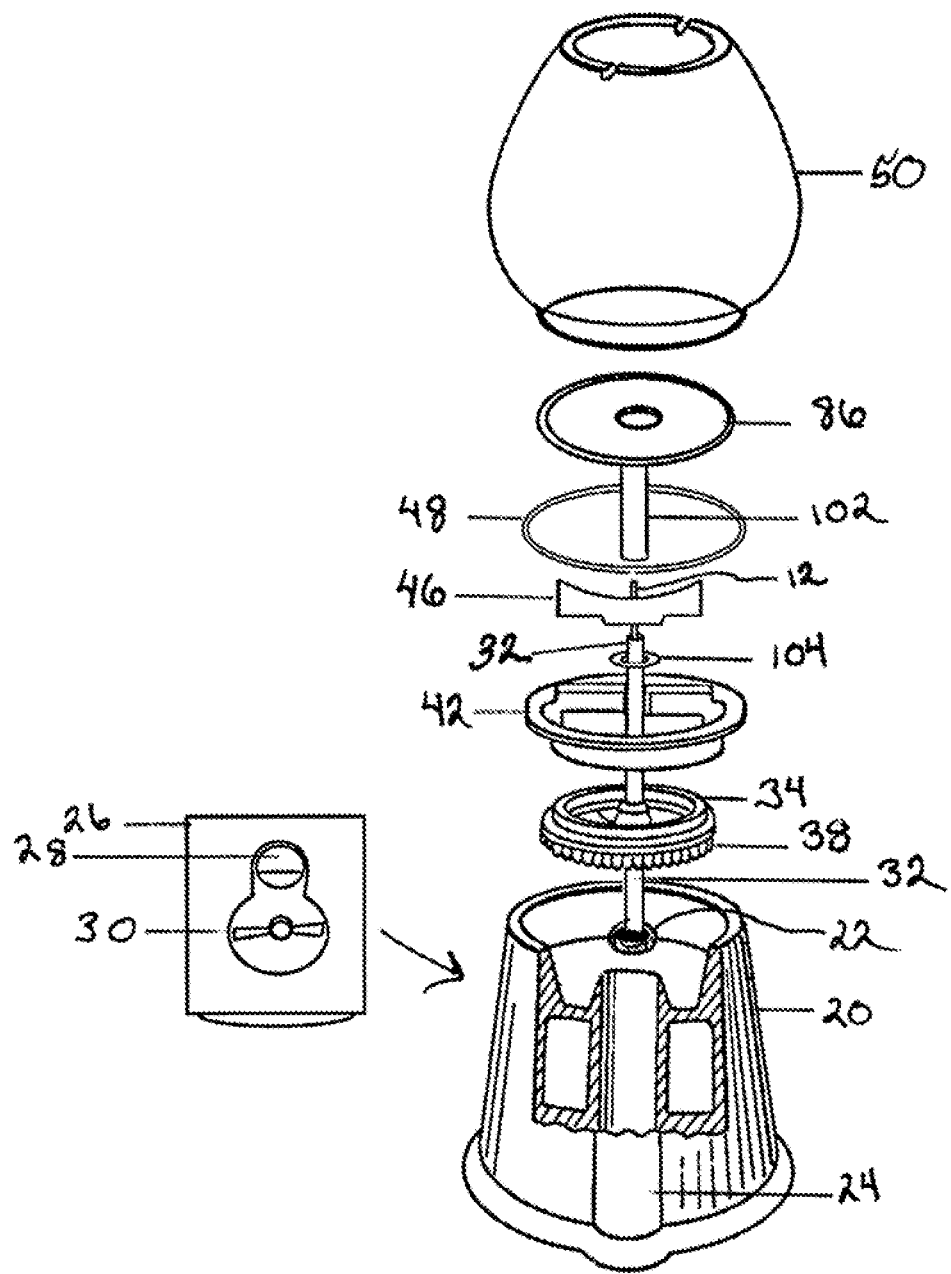
FIG. 25 is an exploded front elevational view illustrating an improvement to solar light vending machine and assembly of certain components of FIG. 1.

FIG. 25 illustrates an improvement to invention of assemblage of certain components to turntable 98 which closely resemble original vending machine design of incorporating brush off plate 42 and base gasket 48 within turntable 98. As in FIG. 24, turntable 98 is comprised of a platform disc with center hole 86 attached to pipe riser 102 attached to adjustable dispensing wheel 34. This improvement stills allows for a diorama 106, further described in FIG. 26, to be attached to turntable 98 creating an enjoyable scene within globe 50. As described in FIGS. 20-24, as handle 30 of coin mechanism 26 is turned clockwise, its attached sprocket 92 engages with wheel ribs 38 of adjustable dispensing wheel 34 rotating turntable 98 counterclockwise one-third. Platform disc with center hole 86, as described in FIG. 22, is attached to a pipe riser 102 of appropriate height so when attached to adjustable dispensing wheel 34, platform disc with center hole 86 is of a height to be clearly seen in globe 50 when assembled. As in FIG. 24, pipe riser 102 is a hollow tube or pipe its diameter large enough to allow passage of outer rod 32 while fitting snugly into wheel center hole 36 of adjustable dispensing wheel 34.

This improvement to invention incorporates brush off plate 42 and base gasket 48 be placed over pipe riser 102 between adjustable dispensing wheel 34 and platform disc with center hole 86, but not attached to either. Pipe riser 102 is affixed to wheel center hole 38 of adjustable dispensing wheel 34; brush off plate 42 is inserted—not affixed—on top of adjustable dispensing wheel 34 over pipe riser 102; base gasket 48 is inserted—not affixed—over brush off plate 42; platform disc with center hole 86 affixed to pipe riser 102. An improvement to invention is to affix a washer 104 to brush off plate center hole 44 on top of brush off plate 42. Washer 104 affixed to brush off plate 42 provides a fixed center slot for insertion over outer rod 32 thereby aiding alignment in assembly. The washer 104 is of any size smaller or equal to than platform disc with hole 86 with center opening large enough for pipe riser 102 to pass through. As commonly available, reducing or flat washer 104 is cost effective option to this improvement.

Certain components and assembly of solar light vending machine illustrated in FIG. 25 utilizing this method of assembly of turntable 98 are described as: a base 20 to which coin chute cover 24 and coin mechanism 26, coin slot 28, handle 30, are attached. Outer rod 32 is screwed into threaded rod guide 22 of base 20. Splash guard 46 is inserted under front lip of coin mechanism 26. Turntable 98 is inserted into base 20 over outer rod 32 positioning brush off plate 42 and base gasket 48 in correct position. Globe 50 is placed on top of base gasket 48. Remaining assemblage continues per FIGS. 2, 8, 15 and 16. With this method, brush off plate 42 is seen while not interfering with rotation of turntable 98.

Figure 26:
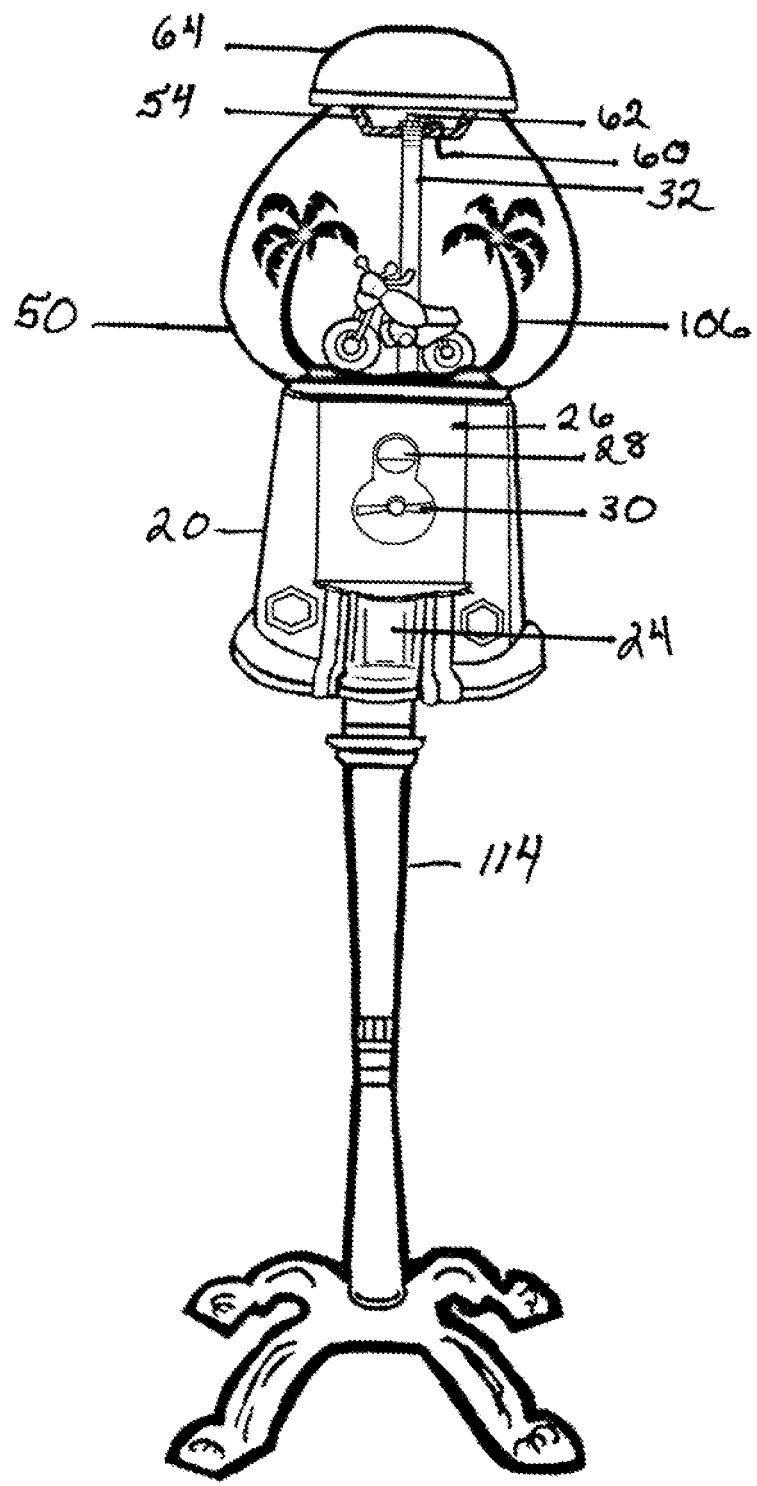
FIG. 26 is a front elevational view illustrating an improvement to solar light vending machine constructed in accordance with the principles of the invention.

FIG. 26 is an improvement to invention of the addition of a diorama 106 to the turntable 98 as described in FIGS. 23, 24 and 25. Dioramas 106 are generally known as three-dimensional full-size or miniature model, sometimes enclosed in a glass showcase. Diorama 106 offers the user a pleasing scene in daylight and illuminated at night by LED bulb 70. Dioramas may be comprised of any scene. It may be suggested that the addition of a base of outdoor green grass carpet to the top of turntable 98, specifically platform riser with center hole 100, is reminiscent of green grass. Diorama 106 must contain an opening directly corresponding to a size to allow free passage of outer rod 32 and be of a width no larger than the lower globe 50 opening. It is suggested diorama 106 be sized no larger than the width of its turntable 98 to allow easy placement of globe 50. Brand specific miniatures, including, but not limited to, 1/64 scale motorcycle, tractor, snowmobile with miniature trees and bushes may comprise diorama 106. City Skylines as commonly sold in souvenir shops as skyline paperweights, may be used with the incorporation of a center hole large enough for the passage of outer rod 32. Product branding or miniature scenes of virtually any activity may be considered for diorama 106.

Solar light vending machine components illustrated in FIG. 26 are described as: a base 20 to which base 20 to which coin chute cover 24 and coin mechanism 26, coin slot 28, handle 30, are attached. Globe 50 is attached to base 20 by means of an inner rod 12 and outer rod 32 secured to a spider basket 54 with outer rod nut 60 and inner rod nut 62 respectively. Base 20 attached to stand 114. Diorama 106 positioned inside base 20 extending upwards into globe 50 around outer rod 32. The solar light cap 64 is attached via snap-on or hook fastener 72 to loop fastener 58 method.

Figure 27:
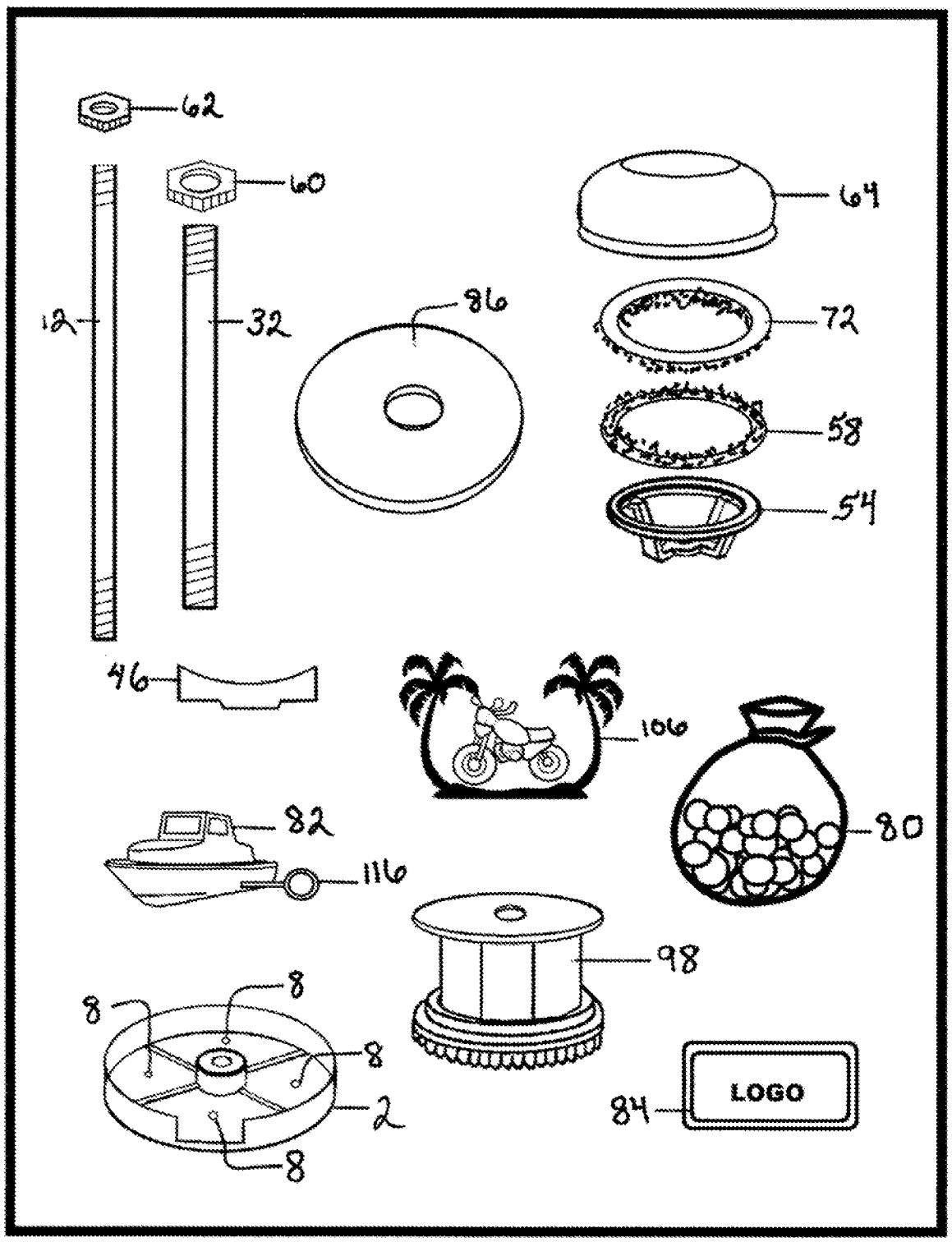
FIG. 27 is a front elevational view illustrating certain components of improvement to invention of FIGS. 1, 5, 6, 8, 9, 15, 16, 19, 22, 23, 24 and 26 as may be offered as conversion kit.

FIG. 27 illustrates an improvement to invention whereby certain components are offered as a conversion kit 112. The conversion kit 112 may be offered in the four common sizes of King, Junior and Petite and Gas Pump for home conversion of current or vintage gumball machine to solar light vending machine. Conversion kit 112 is comprised of: inner rod 12 and inner rod nut 62; outer rod 32 and outer rod nut 60 if found current production length of outer rod 32 needs reduction in length; splash guard 46; and, solar light cap 64. In the event it is determined a snap on solar light cap 64 is the best manufacturing alternative, no further parts are necessary. If cash drawer 16 does not contain drain holes 8, cash drawer 16 may be removed. It is found base plate 2 usually contains air/drain holes 8. In the event it does not, a base plate 2 with drain holes 8 may be offered as part.

In the event a solar light cap 64 used whereby the light housing is constructed such that there is no outer rim and the lower under unit is relatively flush with its rim, a hook fastener 72 and loop fastener 58, commonly known as Velcro®, or hook fastener 72 to hook fastener 72, commonly known as Command™ Picture Hanging Strips, is made available in conversion kit 112. The hook fastener 72 may be attached to underside of solar light cap 64 prior to packaging and shipping to ensure best placement. The pre-cut to size loop fastener 58 or hook fastener 72 with outdoor adhesive is included in conversion kit 112 for easy installation to already owned spider basket 54. In the event the improvement to invention of enhancing spider basket 54 is produced, that enhanced spider basket 54 may be offered as an optional part. Detailed specifications of all such certain components previously described in FIGS. 2-25.

An improvement to conversion kit 112 would be to include a postage prepaid envelope for return shipping of no longer needed traditional cap 76 and cap screw 78. Those parts, currently available as new parts, may be resold by supplier as original vintage parts. This method in effect recycles otherwise unused parts, at a low cost to supplier, and makes available to collectors desired vintage stock.

It is anticipated great improvements will be made to solar light caps 64, LED bulb 70 and all parts therein in the future. An improvement to invention may include solar energy powers the rotation of turntable 98 in addition to providing light. Conversion kit 112 may be comprised of upgraded solar light cap 64 as replacement for solar light cap 64 on currently owned solar light vending machine.

It should be noted that fill 80 may also be considered an element of conversion kit 112 whereby the appropriate amount of non-perishable fill 80 in relation to globe 50 size is prepackaged by theme as described in FIG. 19 and offered as part of conversion kit 112, and/or as a separate part. Accordingly, a figurine 82 with swivel ring 116, and fill 80 and/or decal(s) 84, or a combination thereof, may also be considered as an element of conversion kit 112 as described in FIG. 19. Conversion kit 112 may also include turntable 98 components, diorama 106 and/or platform disc with center hole 86 options as detailed in FIGS. 22-26.

Figure 28:
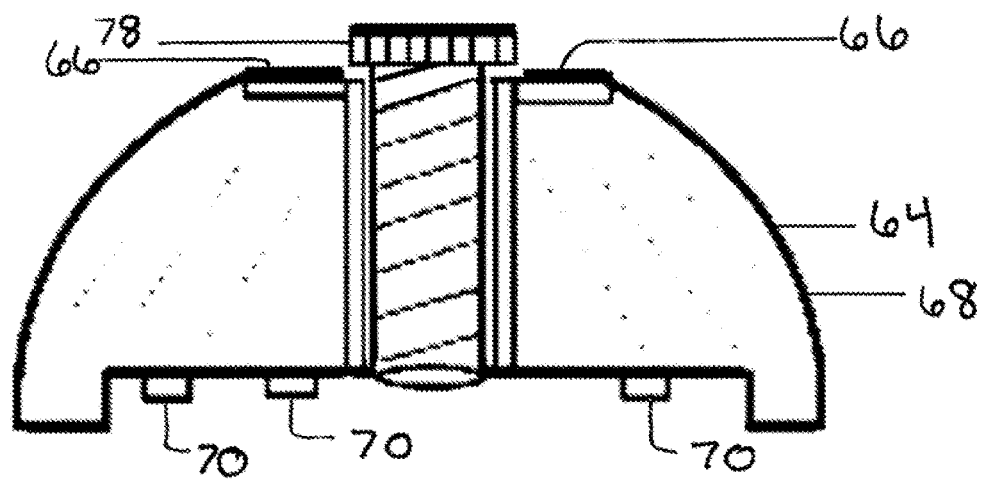
FIG. 28 is a front elevational sectional view illustrating alternative improvement of component of solar light vending machine and assembly of certain components of FIG. 1.

FIG. 28 is a front elevational sectional view representing a solar light cap 64 which may be used with the invention consisting basically of a solar panel 66 (aka amorphous solar panel) mounted on top of solar outer housing 68 which encompasses a rechargeable battery, a photo-resistor arranged to recharge the battery and power the LEDs, and light emitting diode(s) or LED bulbs 70 facing downward. Solar light cap 64 is constructed in design similar to traditional cap 76 to include vertical center screw hole for attachment of cap screw 78 to inner rod 12. Solar panel 66 surrounds this vertical center screw hole on the top of solar light cap 64. Here solar light cap 64 is constructed with solar outer housing 68 extending lower than the interior components thereby creating a rim or outside ring. The inside measurement of the circular rim should be of a size slightly, or at least, larger than outer top rim of spider basket 54. The inner under housing of solar light cap 64 is recessed approximately ⅛" to ¼" or thereabouts deep to partly hide the LED bulb(s) 70. As an example, solar light cap 64 for a King-sized machine is of circular shape with an interior measure of 4" across and recessed ⅛" below the outer housing diameter of 5", whereby a lip is formed. The overall outside height of solar light cap 64 is 1¼". The outer housing and lower lip may be of any dimension and style pleasing to overall design of solar light vending machine while allowing for a secure cap screw 78 installation. As in FIG. 13, this method virtually seals the interior of globe 50 from precipitation and debris associated with outdoor environments, protecting its contents. In addition, the inner rod 12 does not need reduction in length aka height as cap screw 78 replaces inner rod nut 62 no longer needed.

Figure 29:
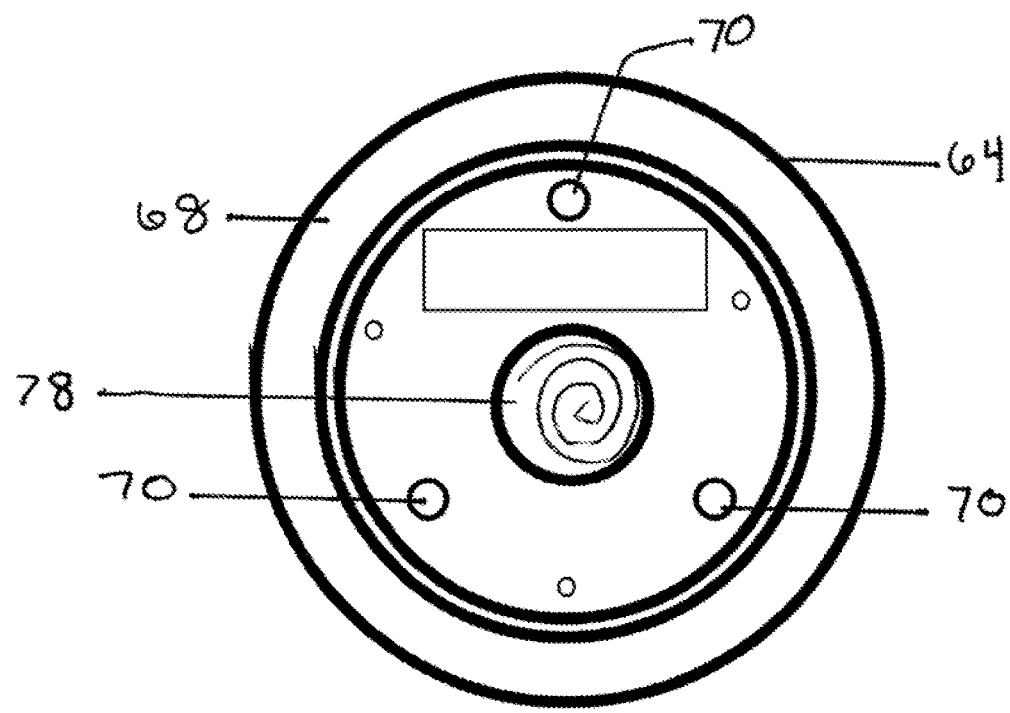
FIG. 29 is an underside view of FIG. 28 illustrating an alternative improvement of component of solar light vending machine and assembly of certain components of FIG. 1.

FIG. 29 is an underside view representing solar light cap 64 as described in FIG. 28. The inner housing is recessed from solar outer housing 68 in a circular shape of a diameter slightly larger than spider basket 54 (See FIGS. 13, 14, 15 and 16) and at a depth of approximately ⅛" to resemble traditional cap 76. LED bulbs 70 are shown surrounding the cap screw 78 center hole within the inside rim of the solar light cap 64. LED bulb(s) 70 may be placed such that their illumination is not blocked by spider basket 54 for maximum illumination of globe 50 and contents.

Figure 30:
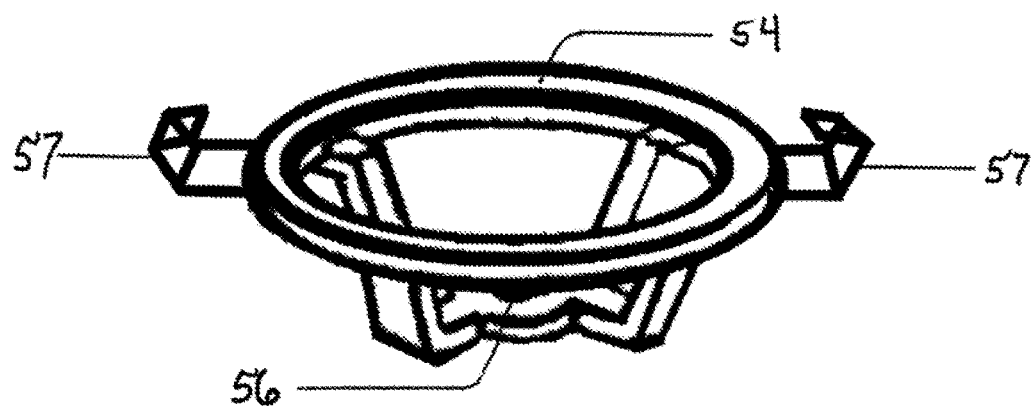
FIG. 30 is underside view illustrating an alternative improvement to component of solar light vending machine and assembly of certain components of FIG. 1.

FIG. 30 is an improvement to invention where spider basket 54 is constructed with spider basket tabs 57 on its topmost outer rim corresponding to width and spacing of currently produced or newly manufactured solar light cap 64 for a tab to slot and turn attachment of solar light cap 64 to spider basket tabs 57 of spider basket 54 of assembled solar light vending machine. Number of spider basket tabs 57 on spider basket 54 one or more, its measurements in direct correlation to solar light cap slots 67 currently produced or newly manufactured. King, Junior, Petite and Gas Pump, etc. sized spider basket 54 modified respectively to correspond to solar light cap slots 67 of solar light cap 64 size most appropriate to fit globe 50 of solar light vending machine. Likewise, screw threads may be molded onto topmost outer rim of spider basket 54 to attach solar light cap 64 constructed with corresponding screw threads.

Figure 31:
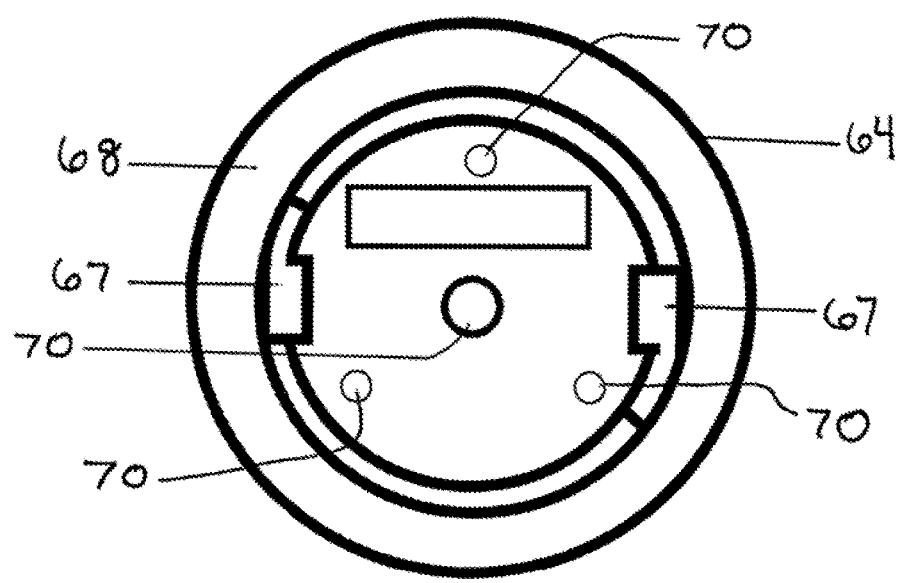
FIG. 31 is underside view of FIG. 30 illustrating an alternative improvement to component of solar light vending machine and assembly of certain components of FIG. 1.

FIG. 31 is underside view representing solar light cap 64 appropriate to correspond with improvement of spider basket 54 illustrated and described in FIG. 30. Solar Path Light currently manufactured with turn slots into which its globe, comprised with horizontal tabs, is attached. Solar light cap 64 shown with solar light cap slots 67 of width, depth and spacing in direct correlation to spider basket tabs 57. Solar light cap 64 is placed onto assembled spider basket 54 lining up solar light cap slots 67 to spider basket tabs 57 to turn, snap or otherwise join to secure solar light cap 64 to solar light vending machine. Solar light caps 64 with solar light cap slots 67 may be manufactured to directly correspond with various sizes of spider baskets 54 and their spider basket tabs 57. Likewise, screw threads may be molded or constructed into solar light cap 64 corresponding with screw threads of topmost outer rim of spider basket 54 to attach solar light cap 64 to solar light vending machine. LED bulb(s) 70 of solar light cap 64 may be placed such that their illumination is not blocked by spider basket 54 for maximum illumination of globe 50 and contents.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method and examples, but by all embodiments and methods within the scope and spirit of the invention as claimed.

The invention claimed is:

1. A system for converting a vending machine to contain a rotary turntable comprising:
 a platform disc, a diorama, and a platform riser;
 the platform disc having a first end and a second end, wherein the first end of the platform disc has an inside opening and the second end of the platform disc has an outer rim;
 the platform riser having a first end and a second end, wherein the first end of the platform riser has an inside opening and the second end of the platform rise has an outer rim;
 the diorama being coupled to the platform disc; and
 wherein, the platform riser is attached to an adjustable dispensing wheel of the vending machine and the platform disc is attached to a top portion of the platform riser.

2. The system of claim 1, wherein the first end of the platform disc is larger than a diameter of an outer rod of the vending machine.

3. The system of claim 1, wherein the first end of the platform riser is larger than a diameter of an outer rod of the vending machine.

4. The system of claim 1, wherein the second end of the platform riser has a diameter less than or equal to the width of the adjustable dispensing wheel.

5. The system of claim 1, wherein the platform riser has a height, wherein the height is such that when the platform disc is coupled to the platform riser the platform disc is visible within a globe of the vending machine.

* * * * *